(12) United States Patent
Bamba

(10) Patent No.: US 7,397,760 B2
(45) Date of Patent: Jul. 8, 2008

(54) TRANSMISSION APPARATUS

(75) Inventor: Masakazu Bamba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1058 days.

(21) Appl. No.: 10/308,080

(22) Filed: Dec. 2, 2002

(65) Prior Publication Data

US 2004/0008692 A1      Jan. 15, 2004

(30) Foreign Application Priority Data

Jul. 12, 2002      (JP) .............................. 2002-204460

(51) Int. Cl.
*G01R 31/08* (2006.01)

(52) U.S. Cl. ....................... 370/219; 370/220; 370/222; 370/465; 398/3

(58) Field of Classification Search ......... 370/218–227, 370/395.51, 395.52, 415, 395.5, 404, 216, 370/217, 228, 248, 242–245, 412–417, 428, 370/429, 907, 395.53; 398/48–51, 1–8; 714/25, 714/41, 1–7, 13
See application file for complete search history.

(56) References Cited

U.S. PATENT DOCUMENTS 6,222,848 B1 * 4/2001 Hayward et al. ............ 370/222

2002/0176432 A1 * 11/2002 Courtney et al. ............ 370/415

FOREIGN PATENT DOCUMENTS

JP       2001-326620       11/2001

* cited by examiner

*Primary Examiner*—Doris To
*Assistant Examiner*—Ian N Moore
(74) *Attorney, Agent, or Firm*—Katten Muchin Rosenman LLP

(57) ABSTRACT

A transmission apparatus including: a plurality of asynchronous network interface units each having an asynchronous network termination unit for inputting/outputting a packet from/to an asynchronous networks and a mapping unit for converting the packet into a first synchronous frame and vice versa, a plurality of synchronous network interface units each used for inputting/outputting a second synchronous frame from/to a synchronous networks, a buffer provided on at least a first of the asynchronous network interface units, and a control unit for storing a packet output by the asynchronous network termination unit for accommodating a specific asynchronous networks and a packet output by the asynchronous network termination unit of the first asynchronous network interface unit into the buffer by adding identifiers for identifying the asynchronous network termination units in the event of a line failure occurring in a synchronous networks on a route related to the specific asynchronous network.

6 Claims, 38 Drawing Sheets

FIG. 4

PACKET READ CONTROL

Packets are output starting with a packet having the highest priority level. However, packets that can be held in the buffer within the capacity of the buffer are output without taking priority level into consideration.

Packets are converted into a SONET frame starting with a packet having the highest priority level.

PACKET WRITE CONTROL

A packet is stored in a buffer indicated by an identifier included in the packet.

Packets are distributed among buffers in accordance with identifiers included in the buffers.

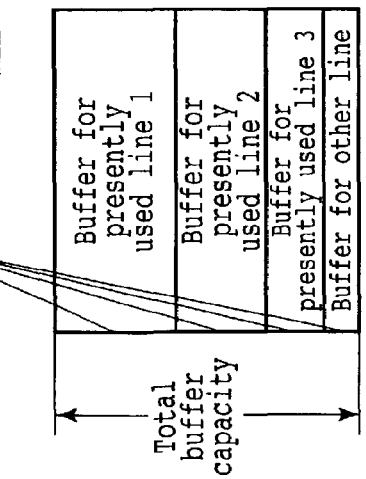

234#i

- Buffer for presently used line 1
- Buffer for presently used line 2
- Buffer for presently used line 3
- Buffer for other line Total buffer capacity

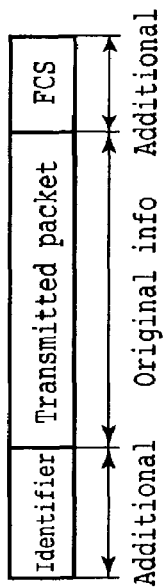

| Identifier | Transmitted packet | FCS |

Additional | Original info | Additional

Additional

TRANSMISSION APPARATUS

BACKGROUND OF THE INVENTION

1. Field of the Invention

The present invention relates to a transmission apparatus (or an NE, which is an abbreviation of Network Element). More particularly, the present invention relates to control to switch a line in the event of a line failure.

2. Description of the Related Art

A variety of switching techniques adopted at the present time to relieve a currently used line from a failure are defined in specifications of a SONET/SDH standard, which is referred to as the SONET standard instead of the SONET/SDH standard. Consider processing to transport a packet in accordance with the SONET standard. Originally, a SONET network is assumed to be a network operated for point-to-point communications of the connection type. For this reason, information flowing through a line in the network is treated equally without distinguishing the priority level of one information from that other information regardless of whether the information is audio information or packet information. Connection information operates in communication of a connectionless type till the information is accommodated in a SONET apparatus. Connection information operating in communication of a connectionless type can be moved in communication of a connection type, which permanently assigns channels for flowing information. If information is moved in communication of a connection type, the communication in which information does naturally flow all the time is converted into a communication for flowing information continuously in a forcible manner. If one considers the fact that the utilization rate of a communication line decreases due to a continuous flow of information, one will know that such a forced continuous flow of information is wasteful.

As a spare line to be used as a relief line of a presently used line in accordance with the construction of the SONET standard, the same line as the presently used line needs to be prepared. If the act to relieve a presently used line by using a spare line is applied to a communication of the connectionless type, the waste of the presently used line used in a communication converted into the connection type is incurred by the spare line as it is. As a matter of fact, the spare line itself is, to the bitter end, a spare line, which is an inefficient line used only in the event of a line failure. During a communication of packet information, not only is the spare line itself inefficient, but the presently used line to be relieved by the spare line is also inefficient. Conventional techniques for relieving a presently used line include APS (Automatic Protection Switching) (1+1), APS (1:N), BLSR (Bidirectional Line Switched Ring), and so on.

FIG. 25 is a diagram showing a change taking place in the event of a line failure with the conventional APS (1+1) technique adopted. As shown in FIG. 25, spare lines 4P#1 and 4P#2 having the same band as the presently used lines 2W#1 and 2W#2 between an NE1#1 and an NE1#2 are needed. As indicated by their names, the spare lines 4P#1 and 4P#2 are each a spare line. Thus, in a normal condition, the spare lines 4P#1 and 4P#2 are not used. It is not until a line failure that is detected on the presently used lines 2W#1 and 2W#2, making it necessary to relieve the presently used lines 2W#1 and 2W#2 that the spare lines 4P#1 and 4P#2 are used.

FIG. 26 is diagrams showing a change taking place in the event of a line failure with the conventional APS (1:N) technique adopted. In the (1:N) configuration, for a plurality of pairs of presently used lines 12W#1j, 12W#2j and 12W#3j between transmission apparatus NE10# and NE10#2 where j=1 and 2, only a pair of spare lines 12P#j where j=1 and 2 is provided. Thus, if failures occur on more than one pair of presently used lines, only one pair can be relieved. FIG. 26 shows typical failing line relieving control executed in the manner of granting priority to the earlier. Assume that a line failure is detected on the presently used lines 12W#11 and 12W#12. In this case, the presently used lines 12W#11 and 12W#12 are replaced by the spare lines 12P#1 and 12P#2 as shown in the middle diagram of FIG. 26. Assume that a line failure thereafter is detected on the presently used lines 12W#21 and 12W#22. In this case, the presently used lines 12W#21 and 12W#22 cannot be relieved as shown in the bottom diagram of FIG. 26.

FIG. 27 is a block diagram showing a configuration adopting the APS (1:2) technique. As shown in FIG. 27, transmission apparatus NE10#i where i=1 and 2 each include ETHER interface units 13#ij where j=1 and 2, a line exchange unit 14#i, presently used OC12 interface units 15#ij where j=1 and 2, and spare OC12 interface units 15#iP. The ETHER interface units 13#ij are typical interface units for interfacing with respect to data, LAN data, data frames and data packets. Spare OC12 interface units 15#iP where i=1 and 2 are in an available state of being not connected to the cards of the ETHER interface units for terminating signals of a terminal. The ETHER interface units 13#ij inputs a packet from a data network such as an ETHER network, maps the packet onto a synchronous frame such as the STS1X 12 synchronous frame and passes on the frame to the line exchange unit 14#i. The line exchange unit 14#i carries out line exchange processing between the ETHER interface units 13#ij where j=1 and 2 and the OC12 interface units 15#ij, 15#iP where j=1 and 2. The presently used OC12 interface units 15#ij and the spare OC12 interface units 15#iP exchange an OC12 packet with the SONET network.

FIG. 28 is a block diagram showing a normal state of the configuration adopting the APS (1:2) technique. As shown in FIG. 28, ETHER termination units 16#ij where j=1 and 2 receive a packet from an asynchronous network and outputs the packet to a SONET mapping unit 17#1j. The SONET mapping unit 17#1j maps the packet onto an STS12×12 synchronous frame. The STS1X 12 synchronous frame is output to the OC12 interface units 15#1j via the line exchange unit 14#1. Multiplexed in an OC12 packet, the STS12×12 synchronous frame is received by the OC12 interface units 15#2j. In this way, the communications between the ETHER interface units 13#1j where j=1 and 2 and the ETHER interface units 13#2j where j=1 and 2 are implemented through the presently used OC12 interface units 15#ij where i=1 and 2 whereas j=1 and 2. At that time, the spare OC12 interface units 15#iP where i=1 and 2 are not functioning.

FIG. 29 is a diagram showing an internal state of the configuration adopting the APS (1:2) technique in the event of a line failure. Assume that a line failure is detected on the presently used line between the presently used OC12 interface units 15#11 and 15#21. In this case, the communication between the ETHER interface units 13#11 and 13#21 is implemented by the spare OC12 interface units 15P#1 and 15P#2.

FIG. 30 is diagrams showing a change taking place in the event of a line failure with the conventional BLSR (NUT+PCA) technique adopted. The PCA is an abbreviation of Protection Channel Access, which is the name of a technology of using a spare side as an unredundant line in order to increase the efficiency of the line utilization. On the other hand, the NUT is an abbreviation of Non-preemptible Unprotected Traffic, which is a line operated as an unredundant line. The NUT is operated as a presently used line of the BLSR technique. By specifying the presently used side as a NUT line and specifying the spare side as a PCA line, it is possible to provide a configuration requiring no line switching even in the event of a line failure occurring on either side. In this case, since the spare side is operated as a PCA line while the presently used side is in a state of being guarded by a NUT line, impossibility of utilization as a relieved line on the presently used side is indicated.

If a PCA line is specified as described above, an independent signal can be flown also to the spare line. By merely specifying a PCA line, in order to relieve a presently used line in the event of a line failure occurring on the presently used line, the independent signal flowing to the PCA line is cut off. If the presently used line is specified as a NUT line, on the other hand, a spare line cannot be switched in even if the presently used line fails. By specifying the presently used side as a NUT line and specifying the spare side as a PCA line, an independent signal can be flown to the spare line and, in addition, no such crushing will occur even in the event of a line failure. However, the presently used line cannot be relieved.

The NEs 20#1, 20#2, 20#3 and 20#4 shown in FIG. 30 form a ring network. A signal from the NE 20#2 reaches the NE 20#4 through line (1) connecting the NE 20#2 to the NE 20#1 and line (2) connecting the NE 20#1 to the NE 20#4. At that time, assume that line (2) is operated as a NUT line, a line failure is detected on line (2) and the BLSR function works. In this case, if the transmission lines are used normally, a signal from the NE 20#2 reaches the NE 20#4 through lines (1), (3), (4) and (5). Since line (3) is operated as a PCA line, however, line (2) operated as a NUT line cannot be relieved.

FIG. 31 is a block diagram showing the conventional BLSR switching technique. As shown in FIG. 31, the NE 20#i has ETHER interface units 30#ij where j=1 and 2, a line exchange unit 32#i, an OC48 east 34#iE and an OC48 west 34#iW. With respect to the NE 20 #1, route (1) includes a line between the ETHER interface unit 30#11 and the OC48 west 34#1W, a line between the OC48 west 34#1W and the OC48 east 34#2E and a line between the OC48 east 34#2E and the ETHER interface unit 30#21. Route (2) includes a line between the ETHER interface unit 30#12 and the OC48 east 34#1E, a line between the OC48 east 34#1E and the OC48 west 34#3W and a line between the OC48 west 34#3W and the ETHER interface unit 30#31. Route (3) includes a line between the ETHER interface unit 30#13 and the OC48 west 34#1W, a line between the OC48 west 34#1W and the OC48 east 34#2E and a line between the OC48 east 34#2E and the ETHER interface unit 30#22.

FIG. 32 is a block diagram showing operations in a normal condition of the NE 20#1 shown in FIG. 31. The ETHER interface units 30#ij where j=1, 2 and 3 have ESTHER termination units 40#1j where j=1, 2 and 3 and SONET mapping units 42#1j where j=1, 2 and 3, respectively. The ETHER termination units 40#1j where j=1, 2 and 3 receive 1 Gbps packets from ETHER networks 50#1j respectively where j=1, 2 and 3, and output the packets to the SONET mapping units 42#1j respectively where j=1, 2 and 3. The SONET mapping units 42#1j where j=1, 2 and 3 map the 1 gbps packets onto STS1×24 frames and output the frames to the line exchange unit 32#1. The line exchange unit 32#1 outputs an STS1 frame input from the SONET mapping units 42#1j where j=1, 2 and 3 to the OC48 west 34#1W, the OC48 east 34#1E and the OC48 west 34#1W respectively in accordance with the line setting. When the OC48 west 34#1W and the OC48 east 34#1E receive STS1X 48 frames, the OC48 west 34#1W and the OC48 east 34#1E map STS1X 48 frames onto an OC48 packet and transmit the packet to a SONET network-BLSR right handed unit 60#R and a SONET network-BLSR left handed unit 60#L.

FIG. 33 is a block diagram showing operations in a normal condition of the NE 20#2 shown in FIG. 31. The OC48 east 34#2E separates an STS1X 24 frame from an OC48 packet received from the SONET network-BLSR left handed unit 60#L, and the line exchange unit 32#2 supplies the STS1X 24 frame to the ETHER interface units 30#21 and 30#22. The ETHER interface units 30#21 and 30#22 demap the STS1X 24 frame back onto a packet, which is transmitted to ETHER networks 50#21 and 50#23.

FIG. 34 is a block diagram showing operations in a normal condition of the NE 20#3 shown in FIG. 31. The OC48 west 34#3W separates a STS1X 24 frame from an OC48 packet received from the SONET network-BLSR right handed unit 60#R and the line exchange unit 32#3 supplies the STS1X 24 frame to the ETHER interface unit 30#31. The ETHER interface unit 30#31 demaps the STS1X 24 frame back onto a packet, which is transmitted to an ETHER network 50#31.

FIG. 35 is a diagram showing routes established in the event of a line failure occurring in the BLSR network. The line failure is detected on a line connecting the NE 20#1 to the NE 20#3. Since route 1 is not affected by the line failure, route 1 remains the same as the normal condition, including a line between the ETHER interface unit 30#11 and the OC48 west 34#1W, a line between the OC48 west 34#1W and the OC48 east 34#2E and a line between the OC48 east 34#2E and the ETHER interface unit 30#21. On the other hand, a signal on a line between the OC48 east 34#1E and the OC48 west 34#3W is lost from route 2. Thus, route 2 is newly established as follows to comprise a line between the ETHER interface unit 30#12 and the OC48 west 34#1W, a line between the OC48 west 34#1W and the OC48 east 34#2E and a line between the OC48 east 34#2E and the ETHER interface unit 30#31. Since route 3 is specified as a PCA route and there is no other NUT specification, no spare line is available. Thus, the route is cut off. At that time, the NEs 20#i where i=1, 2 and 3 enter the following states.

FIG. 36 is an explanatory diagram showing operations carried out by the NE 20#1 shown in FIG. 31 in the event of a line failure. As shown in FIG. 36, the line exchange unit 32#1 carries out exchange processing on a line between the ETHER interface unit 30#12 and the OC48 west 34#1W. Since a connection destination is being used by the ETHER interface unit 30#12, the ETHER interface unit 30#13 does not have a connection destination.

FIG. 37 is an explanatory diagram showing operations carried out by the NE 20#2 shown in FIG. 31 in the event of a line failure. As shown in FIG. 37, the line exchange unit 32#2 carries out exchange processing on a line between the OC48 east 34#2E experiencing exchange processing with the ETHER interface unit 30#22 and the OC48 west 34#2W. Since a connection destination is being used by the ETHER interface unit 30#12, the ETHER interface unit 30#22 does not have a connection destination.

FIG. 38 is an explanatory diagram showing operations carried out by the NE 20#3 shown in FIG. 31 in the event of a line failure. As shown in FIG. 38, the line exchange unit 32#3 carries out exchange processing on a line between the ETHER interface unit 30#31 and the OC48 east 34#3E.

As described above, in the conventional BLSR switching technique, the PCA technique treating a spare line like a presently used line is not capable of relieving a presently used line even if a line failure is detected. This is because, from the first, the PCA concept assumes that a spare line must be used for flowing a signal that must be utilized effectively and a relief operation is not taken into consideration. With this conventional technique, however, the following problem arises. In the case of the conventional technique, much like the packet over SONET technique, information propagating along a line is treated like information of a connection type in spite of the fact that the information is a connectionless type. Thus, the relief operation can be carried out only in line units as described above. As a result, the relief operation cannot be implemented in a way with a spare line used effectively.

SUMMARY OF THE INVENTION

It is thus an object of the present invention to provide a transmission apparatus that has a configuration of implementation not using any original standard, and effectively uses a spare line of a SONET/SDH standard network for transmitting not only information of a connection type, but also information of a connectionless type.

In accordance with an aspect of the present invention, there is provided a transmission apparatus for accommodating a plurality of asynchronous networks and a plurality of SONET/SDH networks, the transmission apparatus including a plurality of asynchronous network interface units each having an asynchronous network termination unit for inputting and outputting a packet from and to one of the asynchronous networks, and a mapping unit for carrying out a conversion process between the packet and a SONET/SDH frame, a plurality of SONET/SDH network interface units each used for interfacing with one of the SONET/SDH networks, a line exchange unit for carrying out line exchange processing between the mapping units and the SONET/SDH network interface units on the basis of line setting, a buffer provided on a first asynchronous network interface unit selected among the asynchronous network interface units to be used as a spare line and a control unit for storing a packet output by the asynchronous network termination unit for accommodating a specific one of the asynchronous networks and a packet output by the asynchronous network termination unit of the first asynchronous network interface unit into the buffer by adding identifiers for identifying the asynchronous network termination units, and reading out the packets from the buffer in the event of a line failure occurring in one of the SONET/SDH networks on a route related to the specific asynchronous network.

Preferably, a packet may be output to one of the asynchronous network termination units that is identified by an identifier added to a packet output by the mapping unit of the first asynchronous network interface unit.

More preferably, the control unit may allocat a first line capacity to the specific asynchronous network related to the route, a synchronous network on which has generated a line failure, and a second line capacity to one of the asynchronous networks that is accommodated by the asynchronous network termination unit of the first asynchronous network interface unit and may control a first packet output by the asynchronous network termination unit accommodating the specific asynchronous network related to the route, a synchronous network on which has generated a line failure, by discarding a second packet output by the asynchronous network termination unit of the first asynchronous network interface unit whose communication traffic exceeds the second line capacity and thus letting the first packet take precedence of the second packet output by the asynchronous network termination unit of the first asynchronous network interface unit.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 4 is a diagram showing control to receive a packet;

DESCRIPTION OF THE PREFERRED EMBODIMENTS

Figure 1:
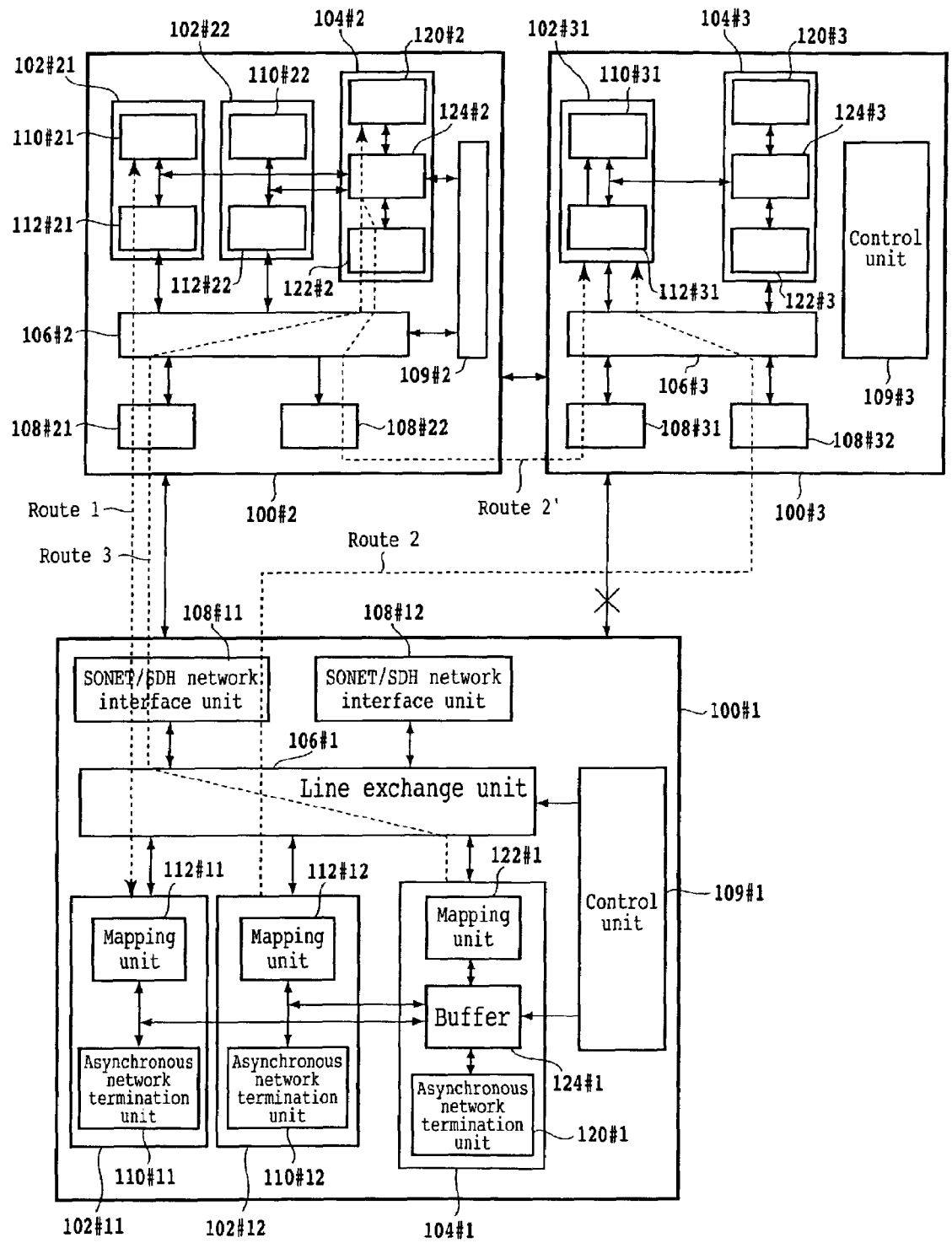
FIG. 1 is a block diagram showing the principle of the present invention.

Before some preferred embodiments of the present invention are described, the principle of the present invention is explained. FIG. 1 is a block diagram showing the principle of the present invention. As shown in FIG. 1, a plurality of NEs 100#i where i=1, 2 and 3 form a network. The NE 100#i comprises a plurality of asynchronous interface units 102#ij where j=1, 2 and so on, a first asynchronous network interface unit 104#i, a line exchange unit 106#i, a plurality of SONET/SDH network interface units 108#ij where j=1, 2 and so on and a control unit 109#i. The asynchronous network interface unit 102#ij has an asynchronous network termination unit 110#ij and a mapping unit 112#ij. By the same token, the first asynchronous network interface unit 104#i has an asynchronous network termination unit 120#i and a mapping unit 122#i. The first asynchronous network interface unit 104#i also includes a buffer 124#i. The NEs 100#i where i=1, 2 and 3 form a ring network.

As shown in FIG. 1, with respect to the NE 100#1, route 1 comprises a line between the asynchronous network termination unit 110#11 and the SONET/SDH network interface unit 108#11, a line between the SONET/SDH network interface unit 108#11 and the SONET/SDH network interface unit 108#21 and a line between the SONET/SDH network interface unit 108#21 and the asynchronous network termination unit 110#21. Route 2 comprises a line between the asynchronous network termination unit 110#12 and the SONET/SDH network interface unit 108#12, a line between the SONET/SDH network interface unit 108#12 and the asynchronous network termination unit 110#32 and a line between the SONET/SDH network interface unit 108#32 and the asynchronous network termination unit 110#31. Route 3 comprises a line between the asynchronous network termination unit 120#1 and the SONET/SDH network interface unit 108#11, a line between the SONET/SDH network interface unit 108#11 and the SONET/SDH network interface unit 108#21 and a line between the SONET/SDH network interface unit 108#21 and the asynchronous network termination unit 120#2.

Assume that a line failure is detected on the line between the SONET/SDH network interface unit 108#12 and the SONET/SDH network interface unit 108#32 on route 2. In this case, the control unit 109#1 newly establishes route 2' to comprise a line between an asynchronous network interface unit 110#12 and the SONET/SDH network interface unit 108#11, a line between the SONET/SDH network interface unit 108#11 and the SONET/SDH network interface unit 108#21, a line between the SONET/SDH network interface unit 108#21 and the buffer 124#2, a line between the buffer 124#2 and the SONET/SDH network interface unit 108#22, a line between the SONET/SDH network interface unit 108#22 and the SONET/SDH network interface unit 108#31 and a line between the SONET/SDH network interface unit 108#31 and the asynchronous network interface unit 102#31 as a substitute for route 2.

The control unit 109#1 writes a packet received by the asynchronous network termination unit 110#12 and 120#1 into the buffer 124#1 by adding an identifier to each of the packets, and then reads back the packets, supplying the packets to the mapping unit 122#1. The mapping unit 122#1 maps each of the packets onto a SONET/SDH frame. The SONET/SDH network interface unit 108#11 multiplexes the SONET/SDH frame with a SONET/SDH frame on the SONET/SDH network side and outputs the multiplexed SONET/SDH frames to a synchronous network.

The SONET/SDH network interface unit 108#2 receives a SONET/SDH frame and passes on the frame to the mapping unit 122#2 by way of the line exchange unit 106#2. The mapping unit 122#2 demaps the SONET/SDH frame back onto a packet. The control unit 109#2 examines an identifier added to the packet in order to form a judgment as to whether or not the packet is to be supplied to the asynchronous network termination unit 120#2 or relay to another asynchronous network as part of control of processing to output a packet to the asynchronous network termination unit 120#2 or relay the packet to a SONET/SDH network. In this way, the buffer 124#1 is shared to raise the efficiency of the utilization of the lines in the event of a line failure.

First Embodiment

Figure 2:
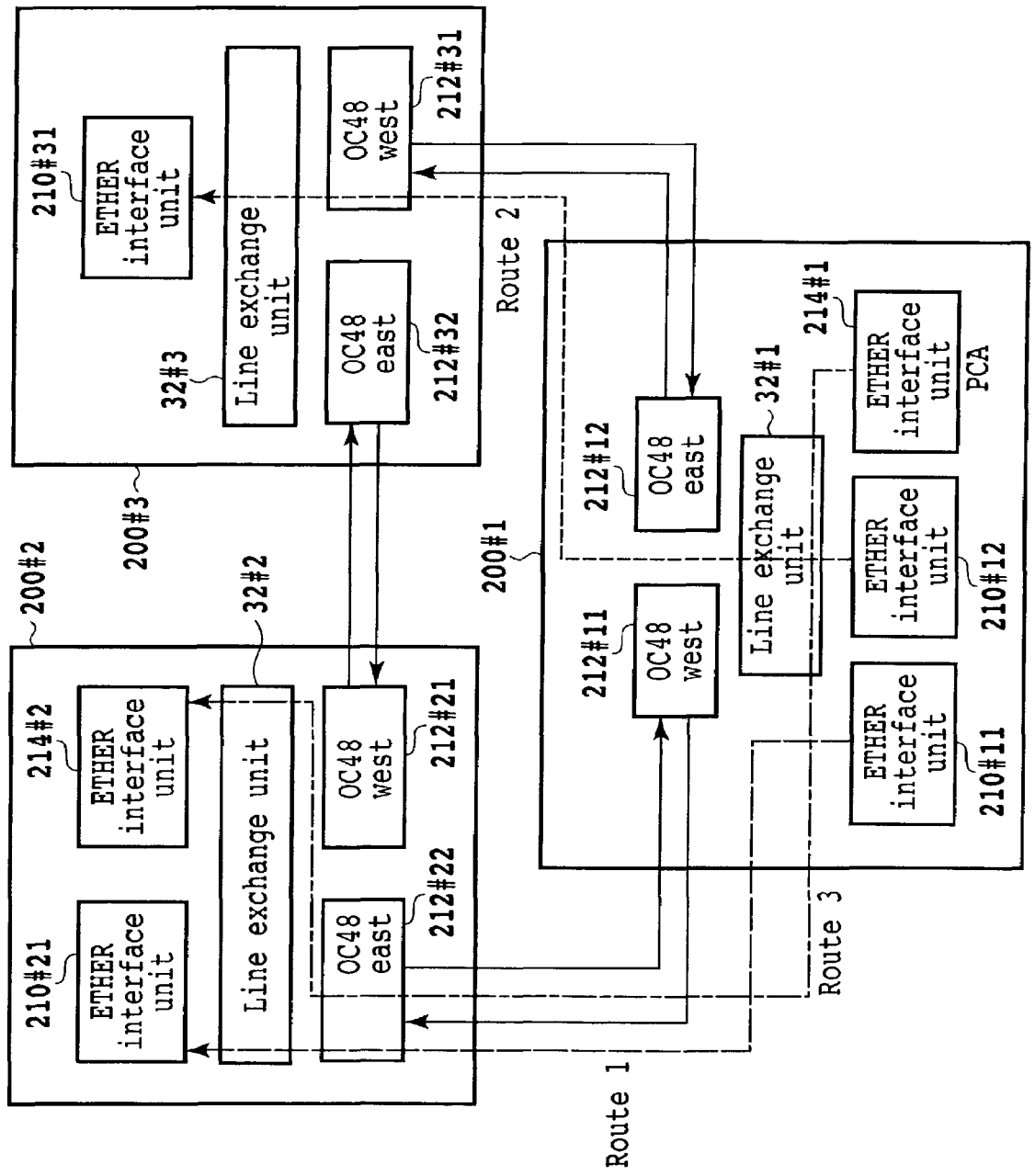
FIG. 2 is a block diagram showing the configuration of a network implemented by a first embodiment of the present invention.
Figure 31:
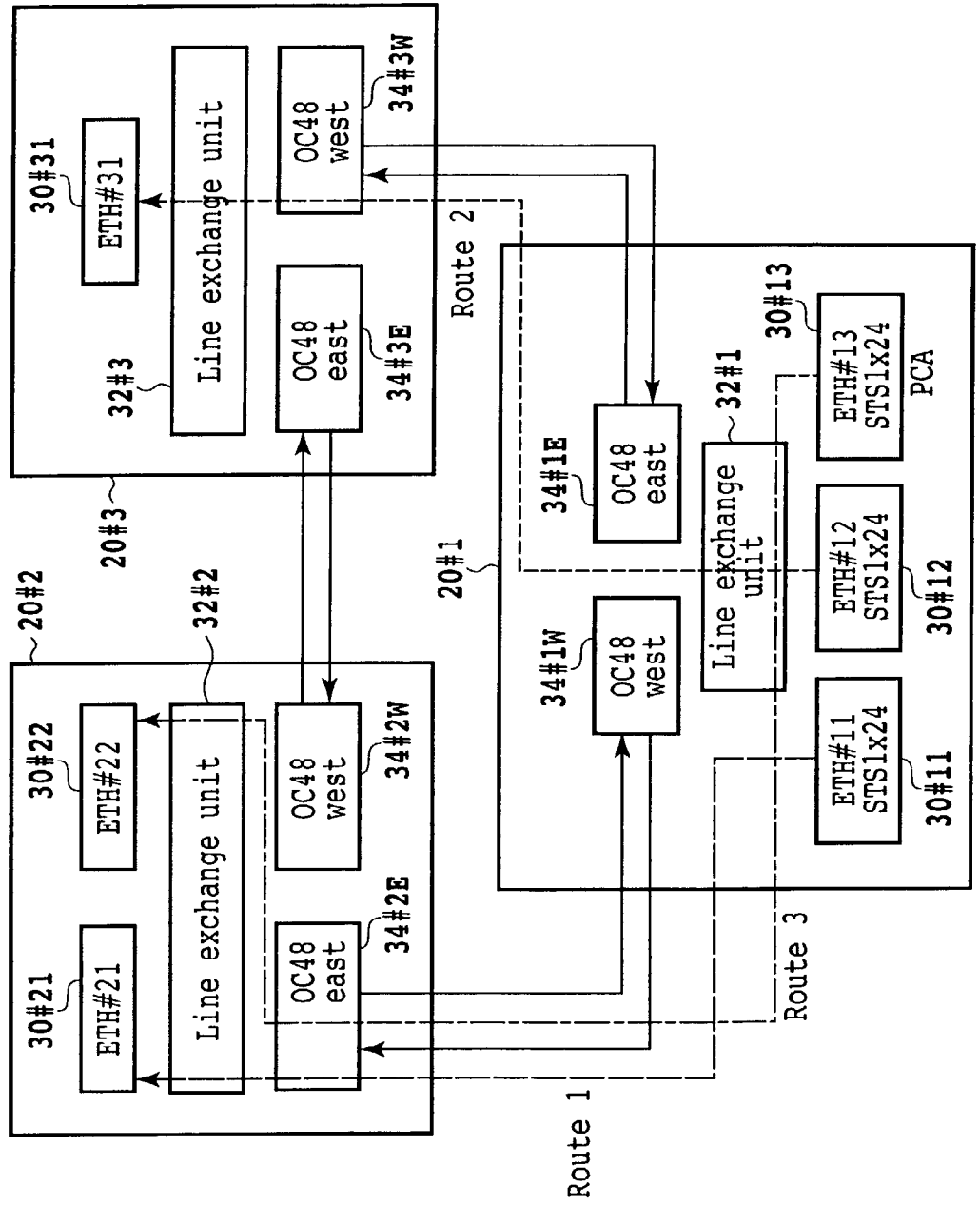
FIG. 31 is a diagram showing a switching technique of the conventional BLSR method.
Figure 32:
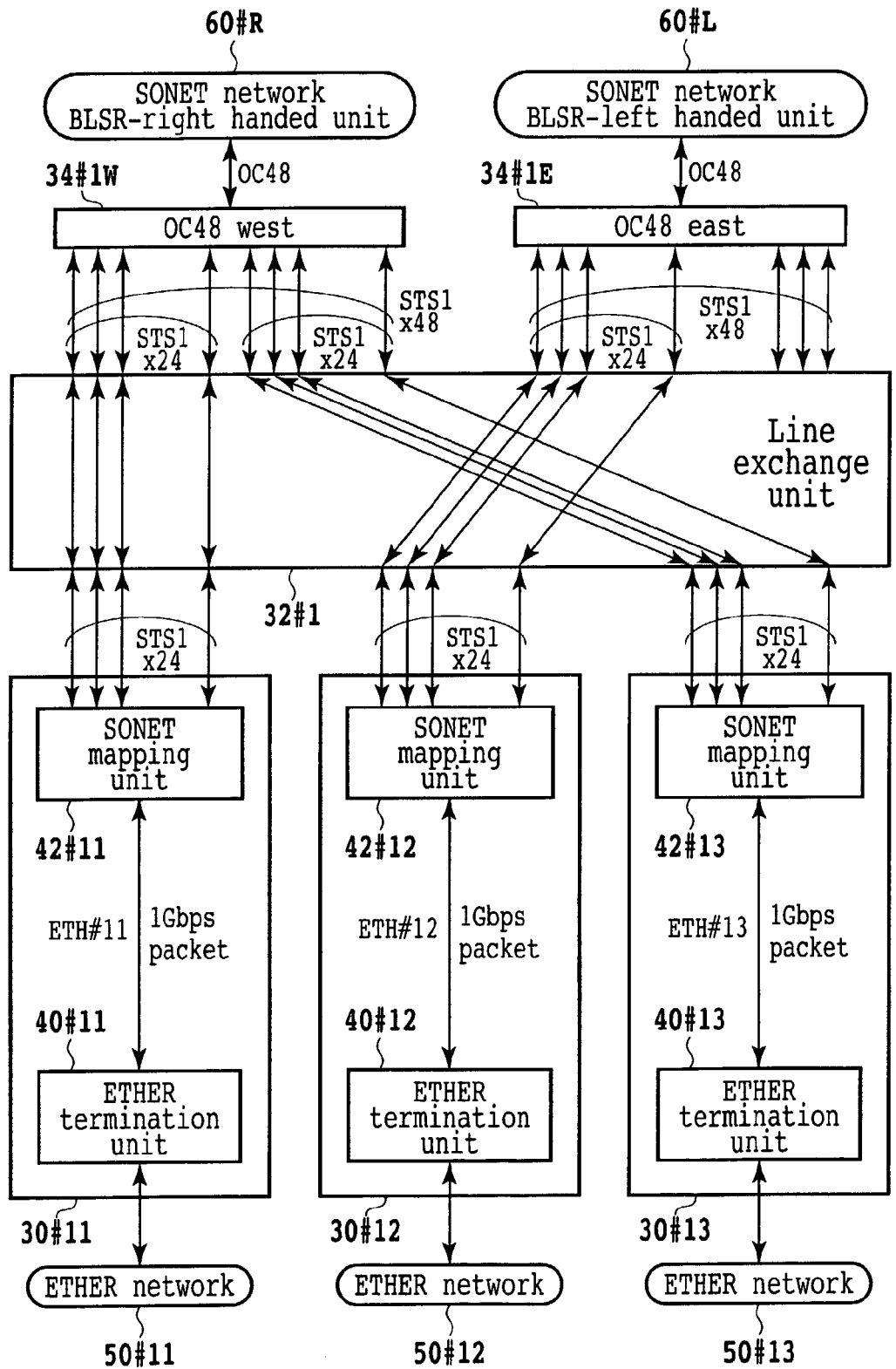
FIG. 32 is an explanatory diagram used for describing operations carried out by an NE 20#1 shown in FIG. 31 in a normal condition.
Figure 33:
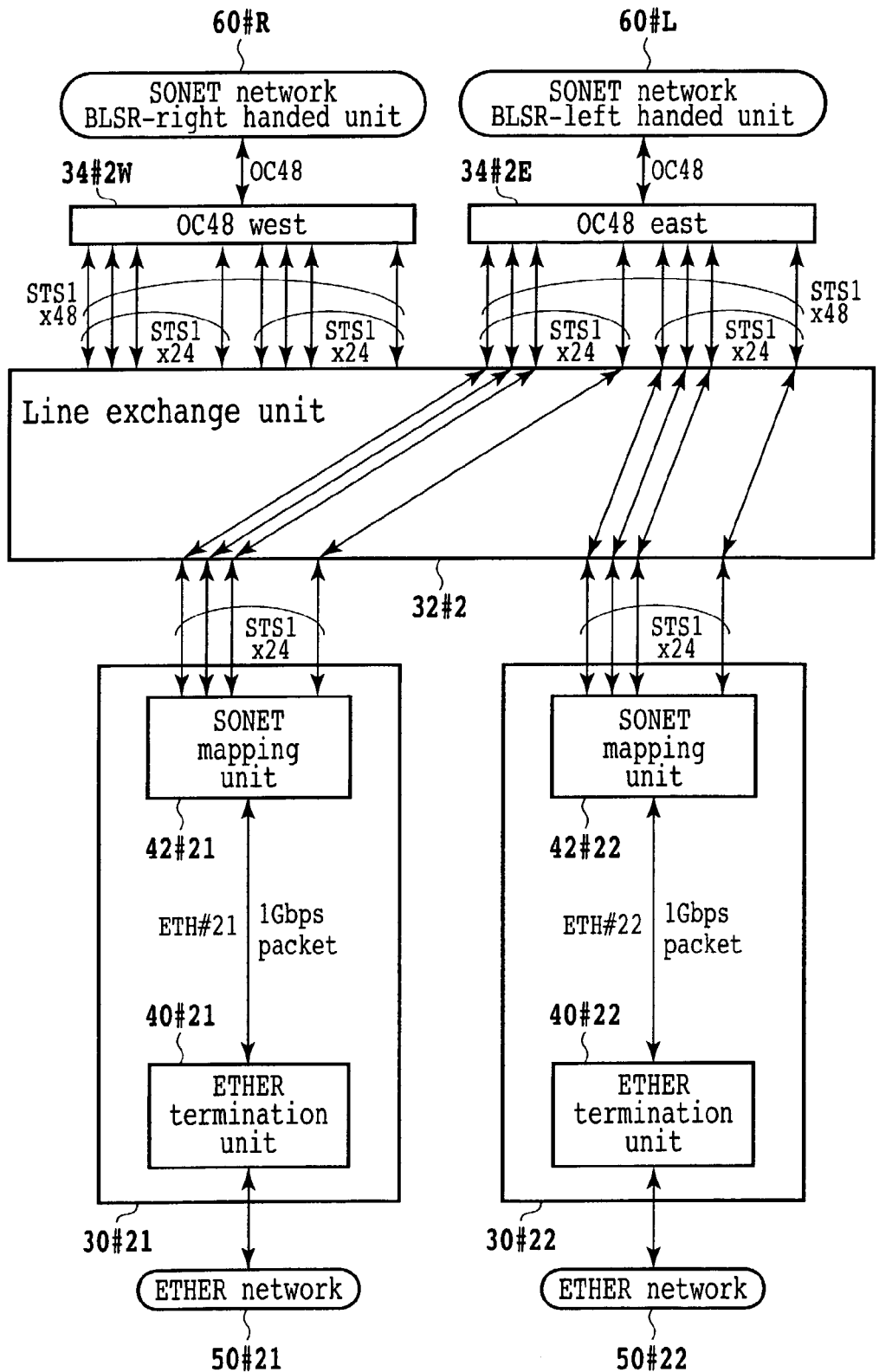
FIG. 33 is an explanatory diagram used for describing operations carried out by an NE 20#2 shown in FIG. 31 in a normal condition.
Figure 34:
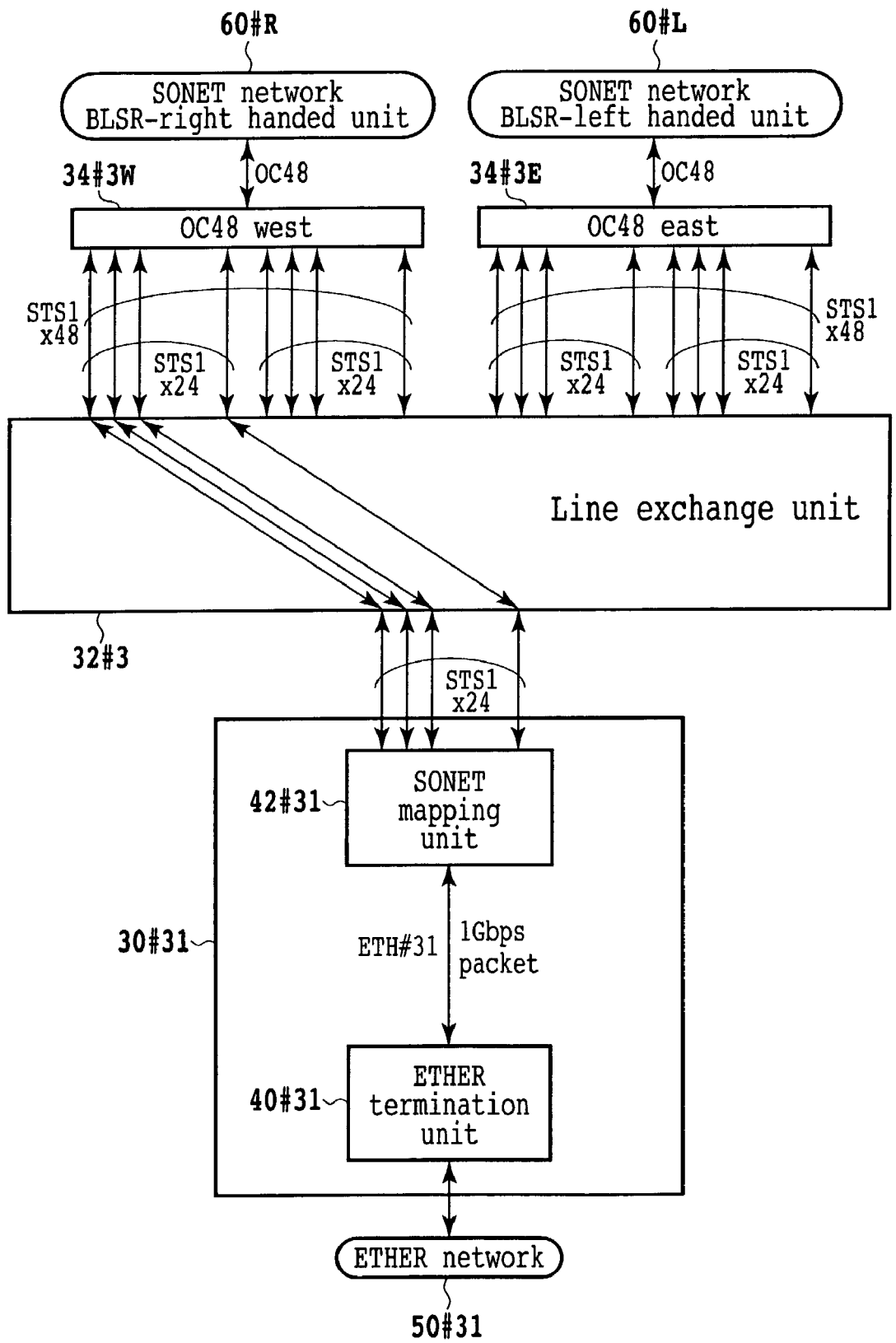
FIG. 34 is an explanatory diagram used for describing operations carried out by an NE 20#3 shown in FIG. 31 in a normal condition.
Figure 35:
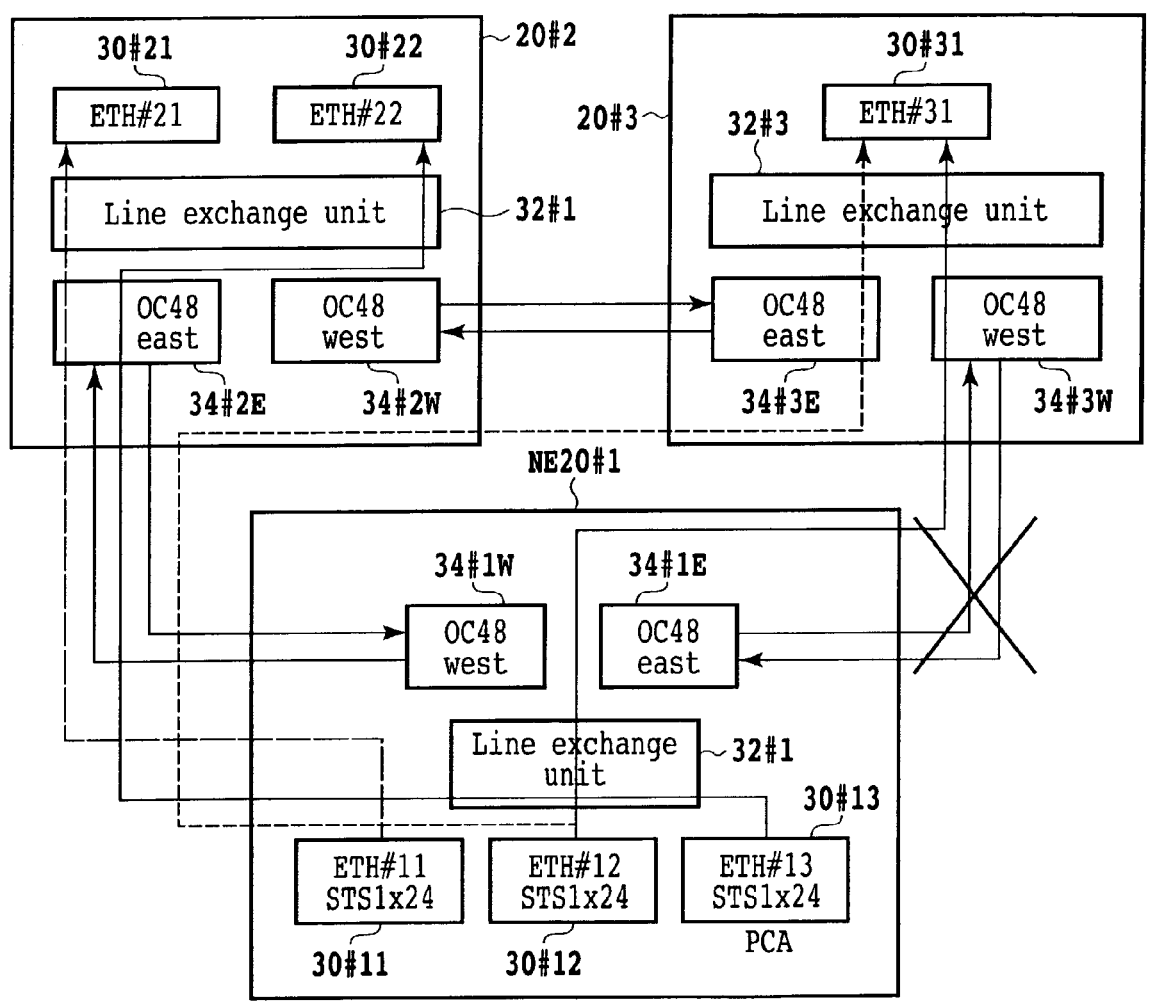
FIG. 35 is a diagram showing a route established in the event of a line failure occurring in a BLSR network.
Figure 36:
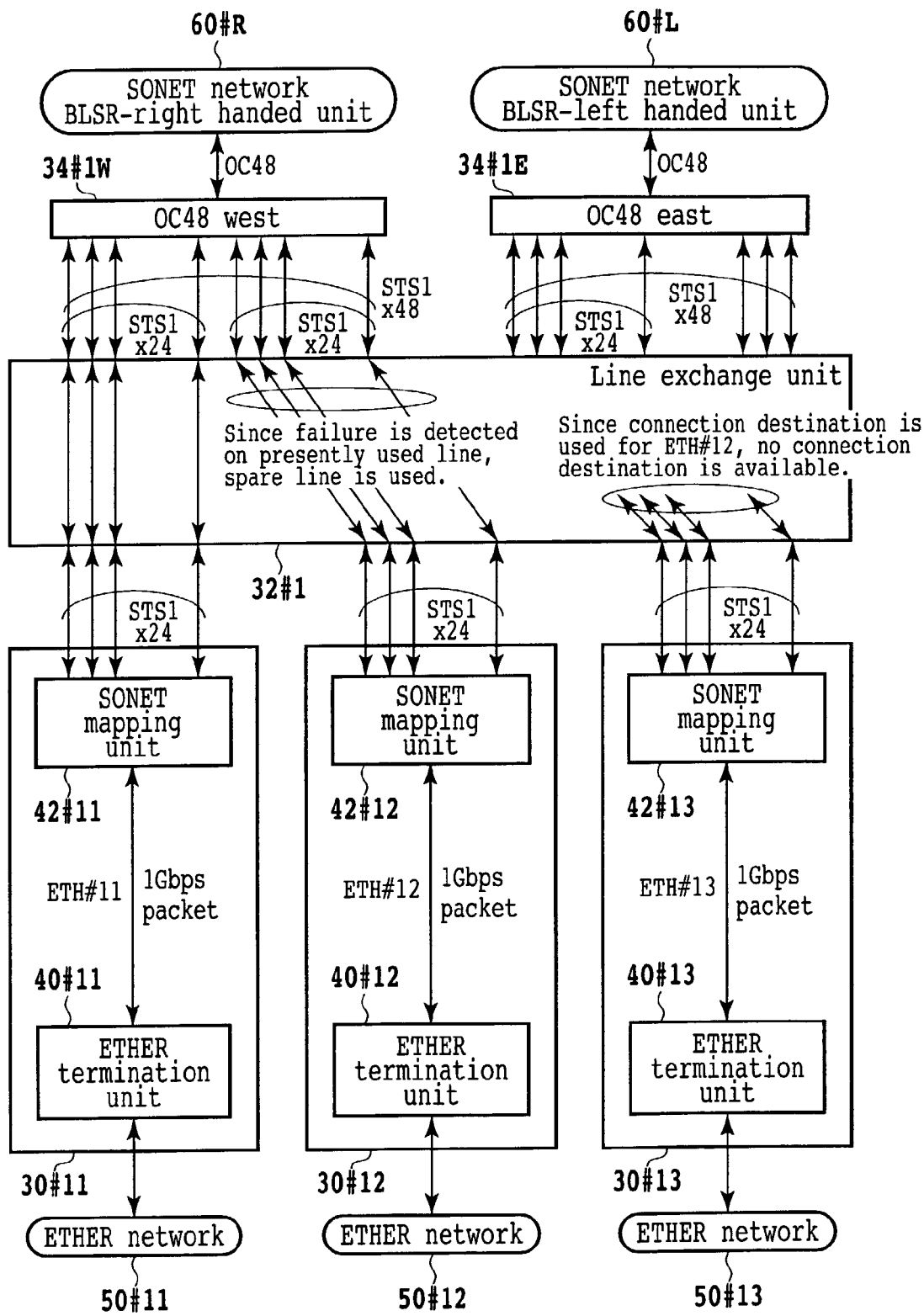
FIG. 36 is an explanatory diagram used for describing operations carried out by an NE 20#1 shown in FIG. 31 in the event of a line failure.
Figure 37:
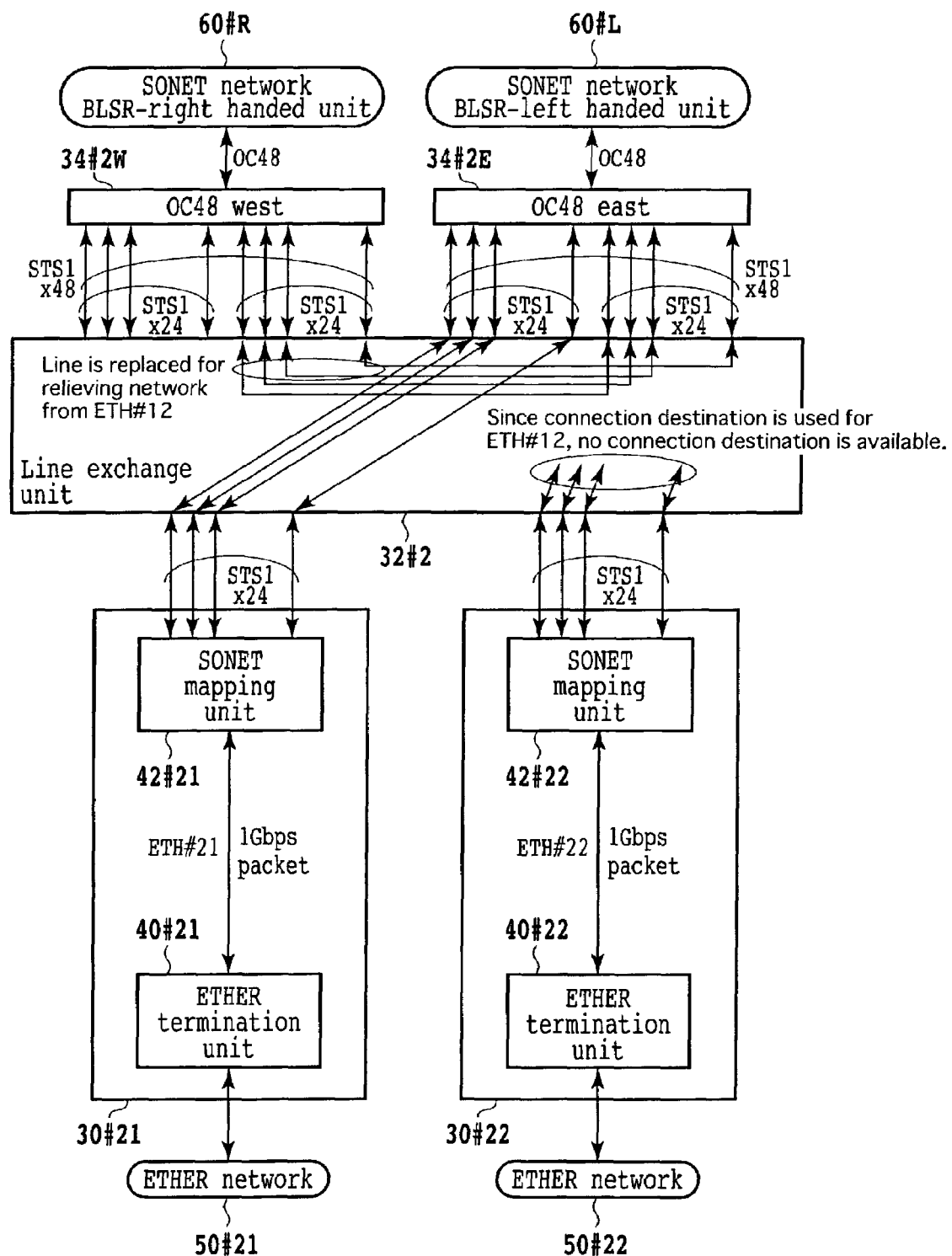
FIG. 37 is an explanatory diagram used for describing operations carried out by an NE 20#2 shown in FIG. 31 in the event of a line failure.
Figure 38:
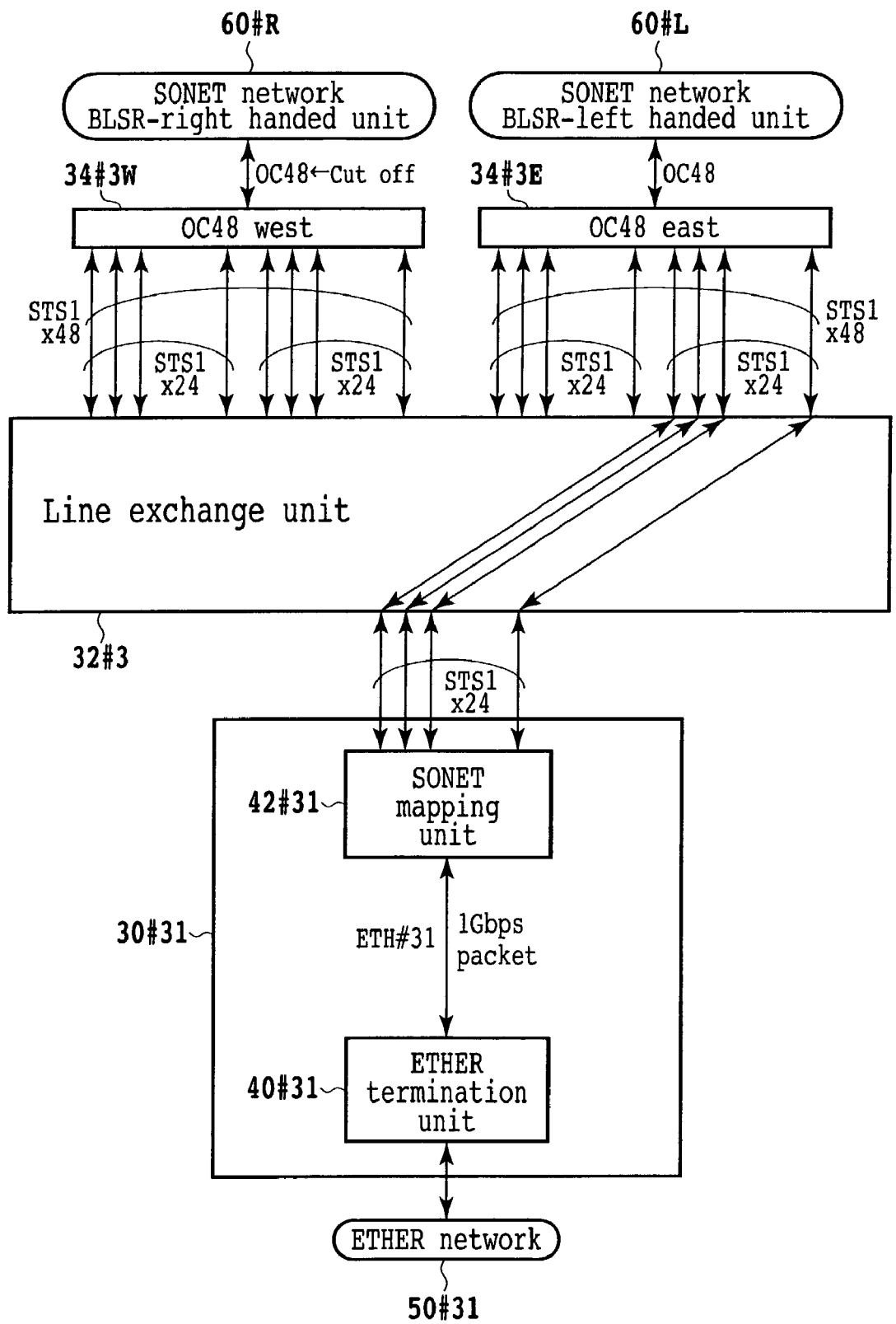
FIG. 38 is an explanatory diagram used for describing operations carried out by an NE 20#3 shown in FIG. 31 in the event of a line failure.

FIG. 2 is a block diagram showing the configuration of a network implemented by a first embodiment of the present invention. As shown in FIG. 2, a plurality of NEs 200#i where i=1, 2 and 3 form a ring network. In this embodiment, in the event of a line failure, a line is switched in accordance with a BLSR recommendation. In a normal state with no line failure generated, routes 1, 2 and 3 with respect to the NE 200#1 are shown as a broken line, a chain line and a single-dotted chain line respectively like those shown in FIG. 31. An ETHER interface unit 214#i uses a spare line in a PCA mode. An ETHER interface is an example of connectionless interface.

Figure 3:
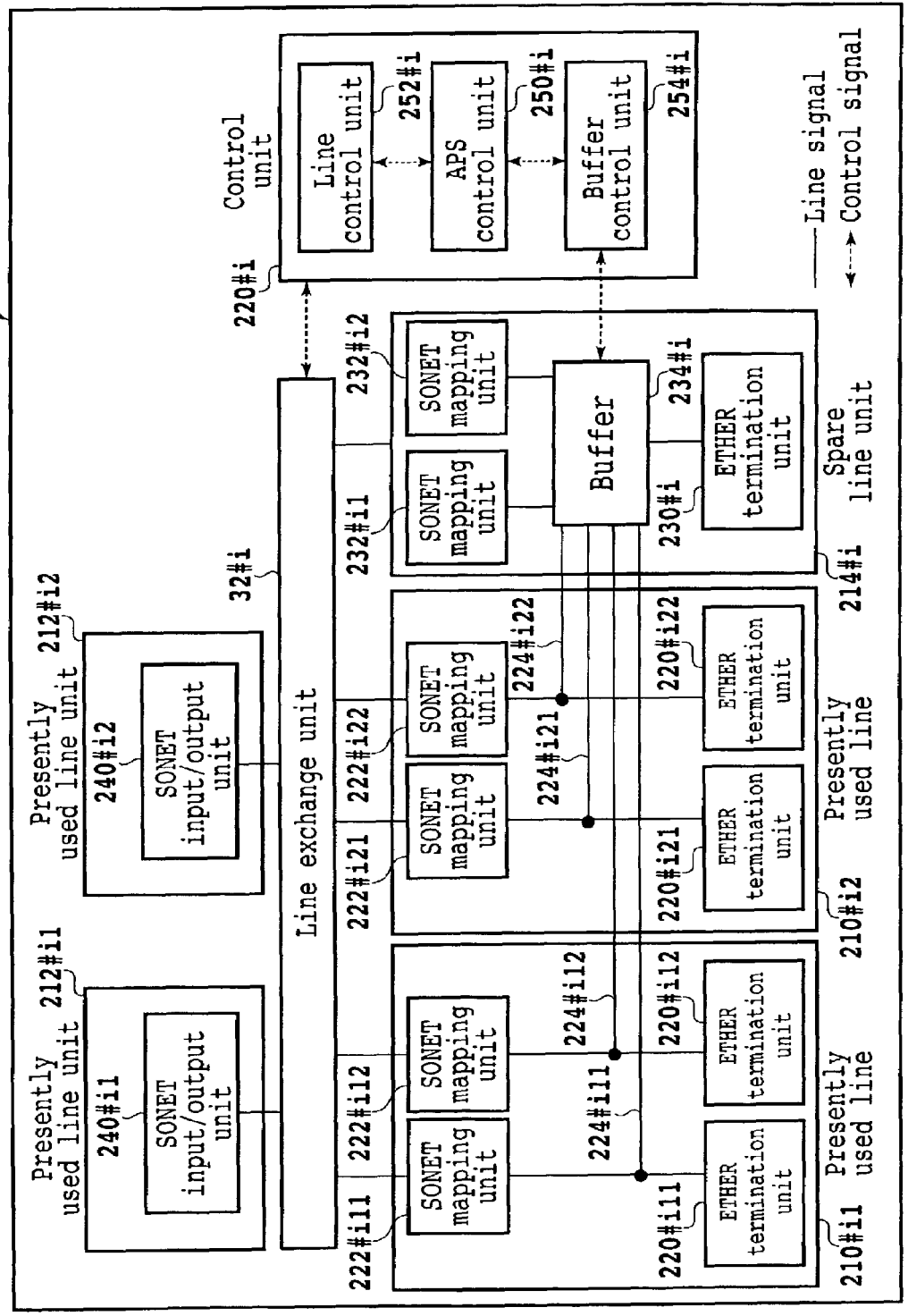
FIG. 3 is a block diagram showing the configuration of an NE used in the network shown in FIG. 2.

FIG. 3 is a block diagram showing a typical configuration of the NE 200#i used in the network shown in FIG. 2. As shown in FIG. 3, the NE 200#i comprises a plurality of presently used line units 210#ij and 212#ij where j=1 and 2, the spare line unit 214#i, a line exchange unit 32#i and a control unit 218#i. The presently used line unit (the ETHER interface unit) 210#i is an ETHER interface board for accommodating an ETHER network. The ETHER interface board is inserted into a slot in the NE 200#i. In the NE 200#i, two presently used line units 210#ij where j=1 and 2 are employed. The number of presently used line units 210#ij can be increased or decreased in dependence on the operation. In addition, also in dependence on the operation, the NE 200#i can also be designed to include no spare line units 214#i and 216#i as is the case with the conventional transmission apparatus. The presently used line unit 210#ij comprises ETHER termination units 220#ijk where k=1 and 2 and SONET mapping units 222#ijk where k=1 and 2.

The ETHER termination unit 220#ijk has the following functions.

(i): Receive a packet from an ETHER network.

(ii): Output a packet received from a buffer 234#i or the SONET mapping unit 222#ijk to an ETHER network.

The SONET mapping unit 222#ijk has the following functions.

(i): Map an input packet onto a synchronous frame such as STS1X 24 and output the frame to the line exchange unit 32#i.

(ii): Input a synchronous frame such as STS1X 24 from the line exchange unit 32#i and demap the frame onto a packet.

The output side of the ETHER termination unit 220#ijk is connected to the buffer 234#i by a signal line 224#ijk. In the event of a line failure occurring on a route involving the ETHER termination unit 220#ijk, the signal line 224#ijk is used for allowing the buffer 234#i to be shared by the alternative route involving the ETHER termination unit 220#ijk and a route including the spare line 214#i by writing a packet received by the ETHER termination unit 220#ijk and a packet received by the ETHER termination unit 230#i into the buffer 234#i. Switching control using the signal line 224#ijk can be executed as follows.

(i): There is provided a method whereby, in a normal condition, a packet received by the ETHER termination unit 220#ijk is output to the SONET mapping unit 222#ijk by way of the buffer 234#i but, in the event of a line failure occurring on a route involving the ETHER termination unit 220#ijk, on the other hand, a packet received by the ETHER termination unit 220#ijk is output to the SONET mapping unit 232#i1. In order to implement this method, the control unit 218#i controls the buffer 234#i.

(ii): There is provided another method whereby, in a normal condition, a switch provided between the signal line 224#ijk and the ETHER termination unit 220#ijk is turned off to output a packet directly to the SONET mapping unit 222#ijk but, in the event of a line failure occurring on a route involving the ETHER termination unit 220#ijk, on the other hand, the switch is turned on to output a packet to the SONET mapping unit 232#i1 by way of the buffer 234#i. The control unit 218#i executes control to turn the switch on and off.

In accordance with control executed by the control unit 218#i, the line exchange unit 32#i outputs an input STS1 frame to a port for the frame. The presently used line unit 212#ij has SONET input/output units 240#i1k where k=1 and 2. The SONET input/output unit 240#ijk has the following functions:

(i): Multiplex an STS1X 24 frame received from the line exchange unit 32#I into OC48, and output the multiplexed frame to a SONET network.

(ii): Separate an STS1 frame from an OC48 packet received from a SONET network and output the frame to the line exchange unit 32#i.

The spare line unit 214#i has an ETHER termination unit 230#i, SONET mapping units 232#ij where j=1 and 2 and a buffer 234#i. The ETHER termination unit 230#i is essentially identical with the ETHER termination unit 220#ijk. The SONET mapping units 232#ij where j=1 and 2 are virtually identical with the SONET mapping unit 222#ijk. In the event of no line failure, the SONET mapping unit 232#ij inputs and outputs a packet from and to an ETHER network accommodated by the ETHER termination unit 230#i. In the event of a line failure, on the other hand, the SONET mapping unit 232#ij inputs and outputs a packet from and to an asynchronous network accommodated by the ETHER termination unit 230#i and an asynchronous network accommodated by the ETHER termination unit 220#ijk involved in a line failure. Since STS1X 12 frames received by the SONET mapping unit 232#i1 are shared by a protection line and a switched route, on the other hand, the SONET mapping unit 232#i2 relays the frame to a SONET network on a route including the switched route.

The buffer 234#i is a buffer memory for holding the following packets. A packet received by the ETHER termination unit 220#ijk involved in a line failure or a packet received by the ETHER termination unit 230#i involved in a line failure in the event of the line failure.

The buffer 234#i may also be provided or each of the ETHER termination unit 230#i, the ETHER termination unit 220#ijk and the SONET mapping unit 232#i1 or shared by the ETHER termination unit 230#i, the ETHER termination unit 220#i and the SONET mapping unit 232#i1.

The control unit 218#i has an APS switching control unit 250#i, a line exchange control unit 252#i and a buffer control unit 254#i. The APS switching control unit 250#i has the following functions:

(i): Monitor a line failure that may occur on a route. In a BLSR configuration, the NEs 200#i where i=1, 2 and so on share switching information. The NEs are managed as NEs in an idle state, a switched state and a pass-through state. In the event of no line failure, the NEs 200#i where i=1, 2 and so on are regarded as NEs in an idle state. In the event of a line failure, on the other hand, the NE 200#1 typically functions as an add/drop switch station having a PCA spare line. The NE 200#2 typically functions as an add/drop pass-through station having a PCA spare line. The NE 200#3 typically functions as a switch station having an add/drop.

(ii): Determine a switched route in accordance with a BLSR recommendation in the event of a line failure. At that time, if a switched route includes a line on a route operated as a PCA spare line, control is executed so as to allow communications through a failing line to be shared by a switched route and a PCA line.

(iii): Give a command indicating a line setting change accompanying a route change to the line exchange control unit 252 #i.

(iv): Give a control command accompanying a route change to the buffer 234#i. The control command is explained as follows.

The buffer control unit 254#i has the following functions.

(1): Control to Receive a Packet

FIG. 4 is a diagram showing the control to receive a packet;

(i): Packet Write Control

Figure 5:
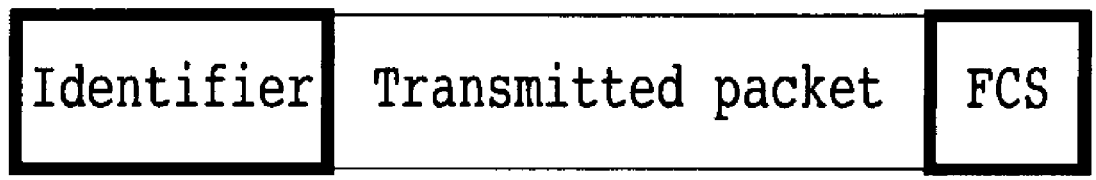
FIG. 5 is a diagram showing the format of a packet.
Figure 6:
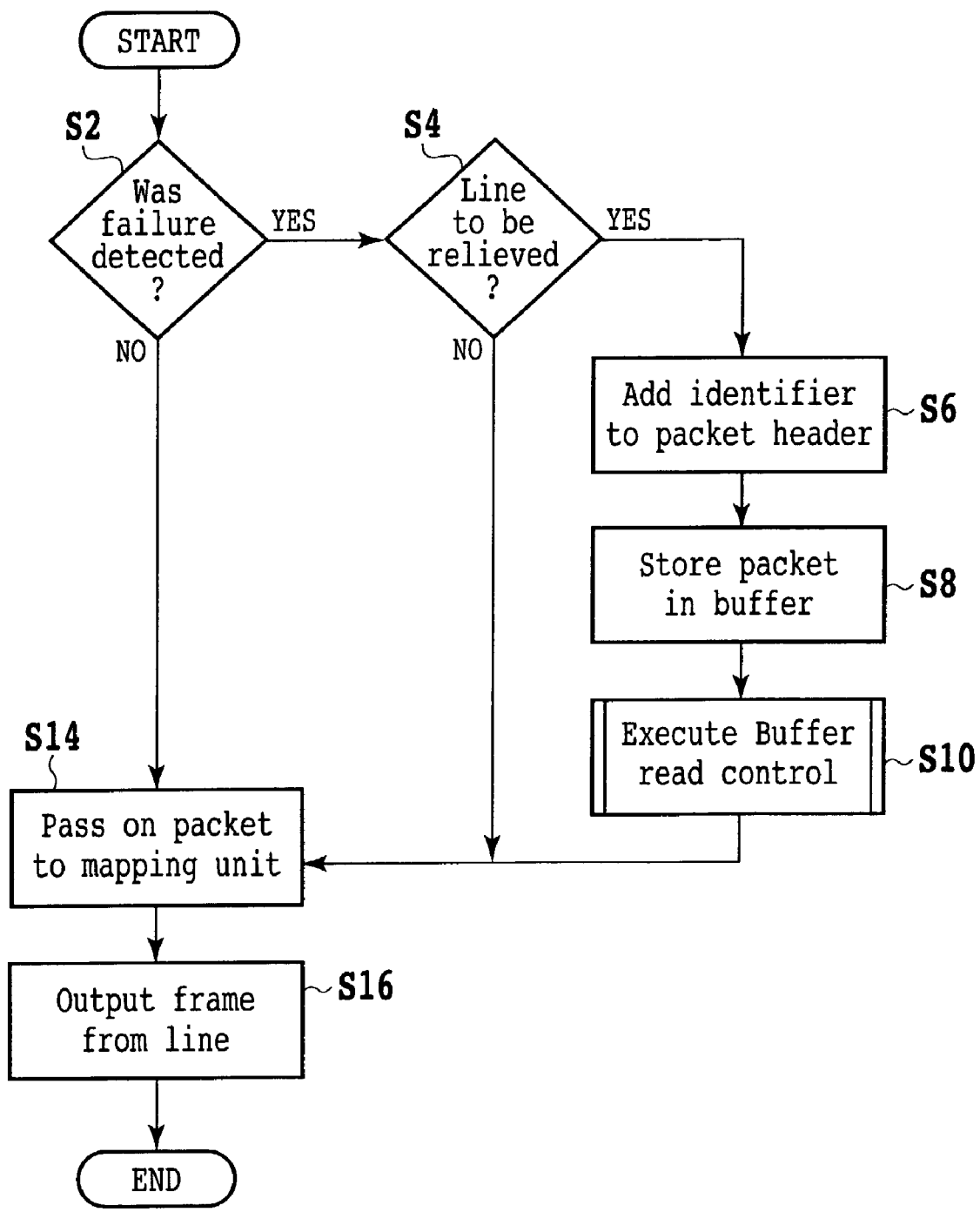
FIG. 6 shows a flowchart representing packet write control.

FIG. 5 is a diagram showing the format of a packet and FIG. 6 shows a flowchart representing packet write control. As shown in the figure, the flowchart begins with a step S2 to form a judgment as to whether or not a line failure has been detected. If a line failure has been detected, the flow of the control goes on to a step S4. If no failure has been detected, on the other hand, the flow of the control goes on to a step S14. At the step S4, the line involved in the line failure is examined to form a judgment as to whether or not the line should be relieved. If the line involved in the line failure is determined to be a line that should be relieved, the flow of the control goes on to a step S6. If the line involved in the line failure is determined to be not a line that should be relieved, on the other hand, the flow of the control goes on to the step S14. A line requiring a relief is a presently used line that is involved in a line failure and needs a relief, or a PCA line used for relieving such a presently used line. An instruction may explicitly indicate that a line does not have to be relieved. An example of such a line is a line with a line failure of a NUT specification. Such a presently used line does not have to be relieved. By providing such a line, the number of variations in operation can be increased.

At the step S6, an identifier is added to the frame at the head of the frame whereas an identifier and an FCS (Frame Check Sequence) found from a transmitted packet are added to the frame at the tail of the frame as shown in FIGS. 4 and 5. These identifiers indicate the source of the packet and a destination to which the packet is to be output. The identifiers are required because, in the event of a line failure, the buffer 234#i for storing frames is shared by a PCA line and a switched route. The identifiers are dependent on the number of ETHER termination units 220#ijk including the ETHER termination unit 230#i where j=1, 2 and so on and k=1, 2 and so on, which are accommodated by the NE 200#i. If the NE 200#i accommodates 8 lines, which are 7 presently used lines and 1 spare line, a 4-bit identifier is required. For example, an identifier having a value of 0 is defined for the spare line. It is to be noted that, in a normal condition, if a line is occupied by the PCA line, it is not necessary to assign an identifier to such a line.

Then, at the next step S8, the packet is stored in the buffer 234#i. Assume for example that the buffer 234#i is provided for each of the ETHER termination units 220#ijk and the ETHER termination unit 230#i as shown in FIG. 4. In this case, the packet is stored in a buffer 234#i in one of and the ETHER termination unit 230#i and the ETHER termination units 220#ijk, that is identified by the identifier. Then, at the next step S10, the packet is read out from the buffer 234#i in accordance with buffer read control to be described later. The flow of the control then goes on to the step S14. At the step S14, the packet is passed on to the SONET mapping unit 232#i1. It is to be noted that, if the packet has been stored into the buffer 234#i, the packet is passed on to the SONET mapping unit 222#ijk, 232#i1 corresponding respectively to the ETHER termination unit 220#ijk, 230#i each receiving the packet. If the outcome of the judgment formed at the step S2 indicates that no line failure has been detected or if the outcome of the judgment formed at the step S4 indicates that the line involved in the line failure is not a line that should be relieved, on the other hand, at the step S14, the packet is passed on to the SONET mapping unit 222#ijk as is the case with a normal state of the line without carrying out a line switching operation. Then, at the next step S16, a frame output by the SONET mapping unit 222#ijk is accommodated in a packet OC48, which is output from a SONET network.

(ii): Packet Read Control

Packet read control is control to discard a packet of either a PCA line or a switched route in case the capacity of the buffer is exceeded in the event of a line failure. This is because, in the event of a line failure, the line is shared by the PCA line and the switched route so that the capacity of the buffer may be exceeded. As shown in FIG. 4, priority levels assigned to packets are used in control to be executed when the capacity of the buffer is exceeded. Packets that can be held in the buffer within the capacity of the buffer are accepted without taking priority levels assigned to the packets into consideration. Packets that will be held in the buffer beyond the capacity of the buffer are accepted on a priority basis. Priority levels are assigned to packets for each identifier in accordance with destination addresses of the packets, source addresses of the packets and whether or not the packet is a network monitoring packet. As a result, when the capacity of the buffer is exceeded, packets are converted into a SONET frame starting with a packet having the highest priority level, and packets with low priority levels are discarded.

Figure 7:
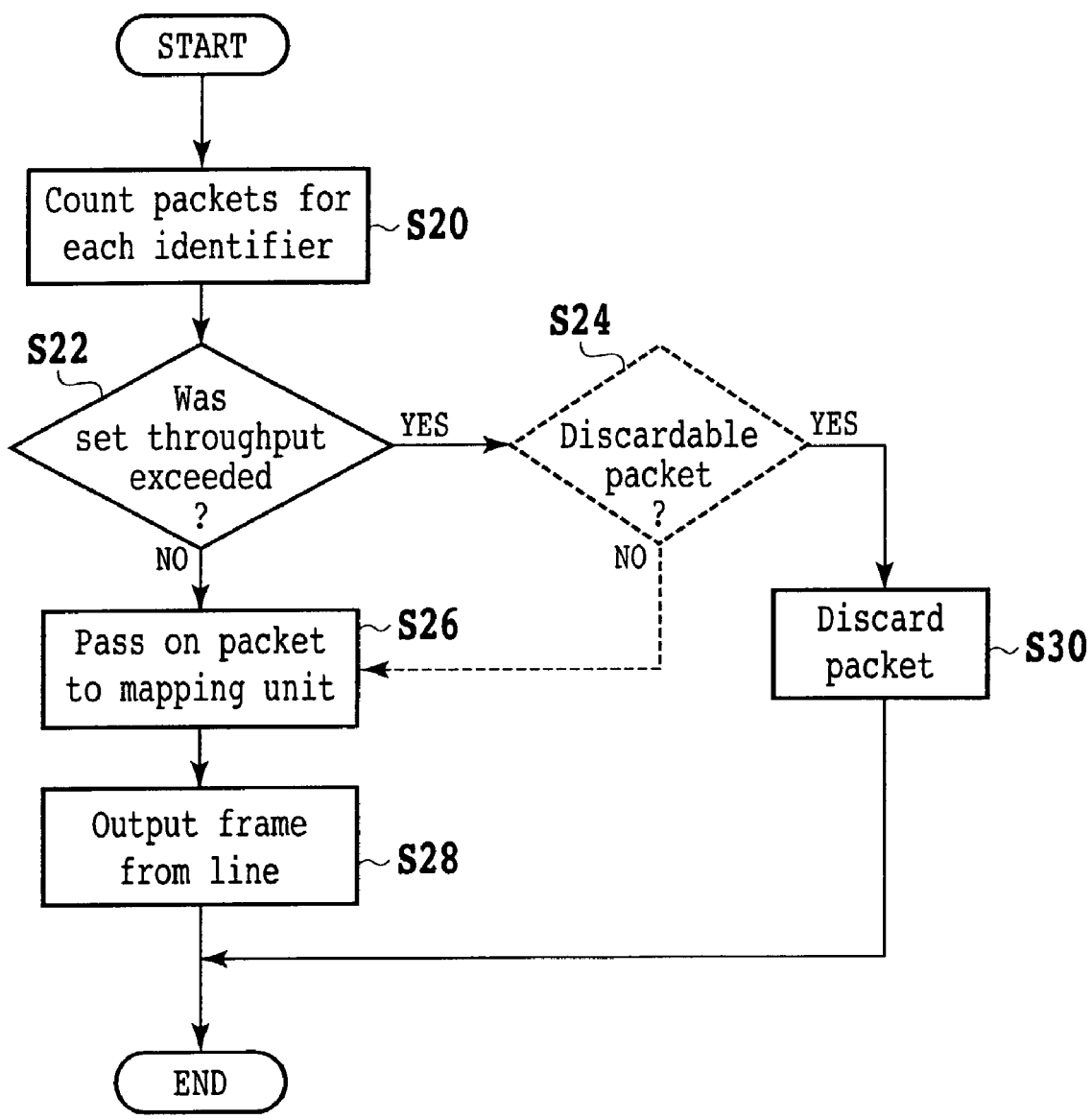
FIG. 7 shows a flowchart representing packet read control.

FIG. 7 shows a flowchart representing the packet read control. As shown in the figure, the flowchart begins with a step S20 at which the number of packets is counted for each passing identifier to measure the throughput for each identifier. Then, the flow of the control goes on to a step S22 to form a judgment as to whether or not a throughput (the minimum capacity cited above) set for an identifier has been exceeded. If the throughput has been exceeded, the flow of the control goes on to a step S24. If the throughput has not been exceeded, on the other hand, the flow of the control goes on to a step S26. At the step S24, the packet is examined to form a judgment as to whether or not the packet can be discarded. If the packet cannot be discarded, the flow of the control goes on to the step S26. Examples of a packet that cannot be discarded are a packet having a specific transmission destination or a packet having a MAC address as its transmission destination, a packet generated by a specific transmission source or a packet having a MAC address as its transmission source and a packet having a high priority level such as a packet mapped onto a network monitoring frame. As described above, in the case of such an undiscardable packet, the flow of the control goes on to the step S26. If the packet can be discarded, on the other hand, the flow of the control goes on to a step S30. At the step S26, the packet is read out from the buffer 234#i and passed on to the SONET mapping unit 222#i1. Then, at the next step S28, the packet is accommodated in an OC48 frame, which is then output from a SONET network. At the step S30, the packet is discarded.

(2): Buffer 234#i Read Control Relevant to Frame Reception

Figure 8:
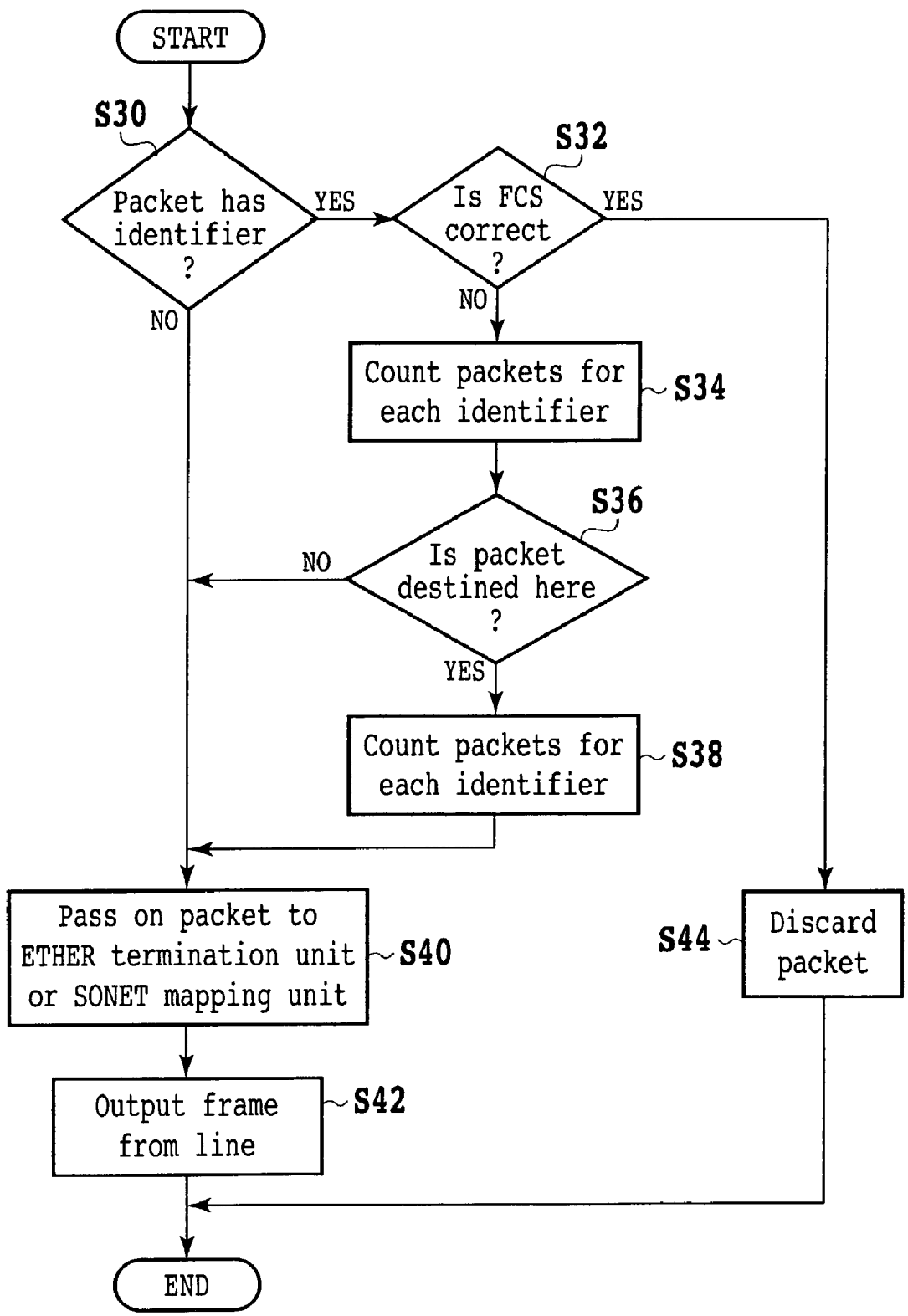
FIG. 8 shows a flowchart representing frame receive control.

FIG. 8 shows a flowchart representing frame receive control. As shown in the figure, the flowchart begins with a step S30 to form a judgment as to whether or not a packet output from the SONET mapping unit 232#i1 is a packet including an attached identifier. If the packet output from the SONET mapping unit 232#i1 is a packet including an attached identifier, the flow of the control goes on to a step S32. If the packet output from the SONET mapping unit 232#i1 is not a packet including an attached identifier, on the other hand, the flow of the control goes on to a step S40. A packet including no attached identifier indicates a packet output in a normal state. At the step S32, the packet is examined to form a judgment as to whether or not the FCS including in the packet is correct. If the FCS including in the packet is correct, the flow of the control goes on to a step S34. If the FCS including in the packet is not correct, on the other hand, the flow of the control goes on to a step S44. At the step S34, the packet is stored in the buffer 234#i.

Then, the flow of the control goes on to a step S36 to form a judgment as to whether or not the packet stored in the buffer 234#i is a packet destined for this NE 200#i on the basis of an identifier included in the packet. If the packet stored in the buffer 234#i is not a packet destined for this NE 200#i, the flow of the control goes on to the step S40. If the packet stored in the buffer 234#i is a packet destined for this NE 200#i, on the other hand, the flow of the control goes on to a step S38. At the step S38, the identifier at the head of the packet is fetched. At the step S40, the packet is passed on to an ETHER termination unit identified by the attached identifier if the packet stored in the buffer 234#i is a packet destined for this NE 200#i, or the packet is passed on to the SONET mapping unit 232#i2 if the packet stored in the buffer 234#i is not a packet destined for this NE 200#i. Then, at the next step S42, the received packet is output from a line. At the step S44, the packet is discarded.

The line exchange control unit 252#i has the following functions:

(i): Control the line exchange unit 32#i in accordance with line setting in the event of no line failure.

(ii): Control the line exchange unit 32#i in accordance with a switching command output by the APS switching control unit 250#i in the event of a line failure.

Next, operations of the network shown in FIG. 2 are explained.

(1): Operations in a Normal State

As shown in FIG. 2, with respect to the NE 200#1, an ETHER signal flows through the following three routes, namely, routes 1, 2 and 3. As shown by a broken line in FIG. 2, route 1 (which is presently used lines) comprises a line between the ETHER interface unit 210#11 and the OC48 west 212#11, a line between the OC48 west 212#11 and the OC48 east 212#22 and a line between the OC48 east 212#22 and the ETHER interface unit 210#21. As shown by a broken line in FIG. 2, route 2 (which is also presently used lines) comprises a line between the ETHER interface unit 210#12 and the OC48 east 212#12, a line between the OC48 east 212#12 and the OC48 west 212#31 and a line between the OC48 west 212#31 and the ETHER termination unit 220#31. As shown by a single-dotted chain line in FIG. 2, route 3 (which is a PCA route) comprises a line between the ETHER interface unit 214#1 and the OC48 west 212#11, a line between the OC48 west 212#11 and the OC48 east 212#22 and a line between the OC48 east 212#22 and the ETHER interface unit 214#2.

Figure 9:
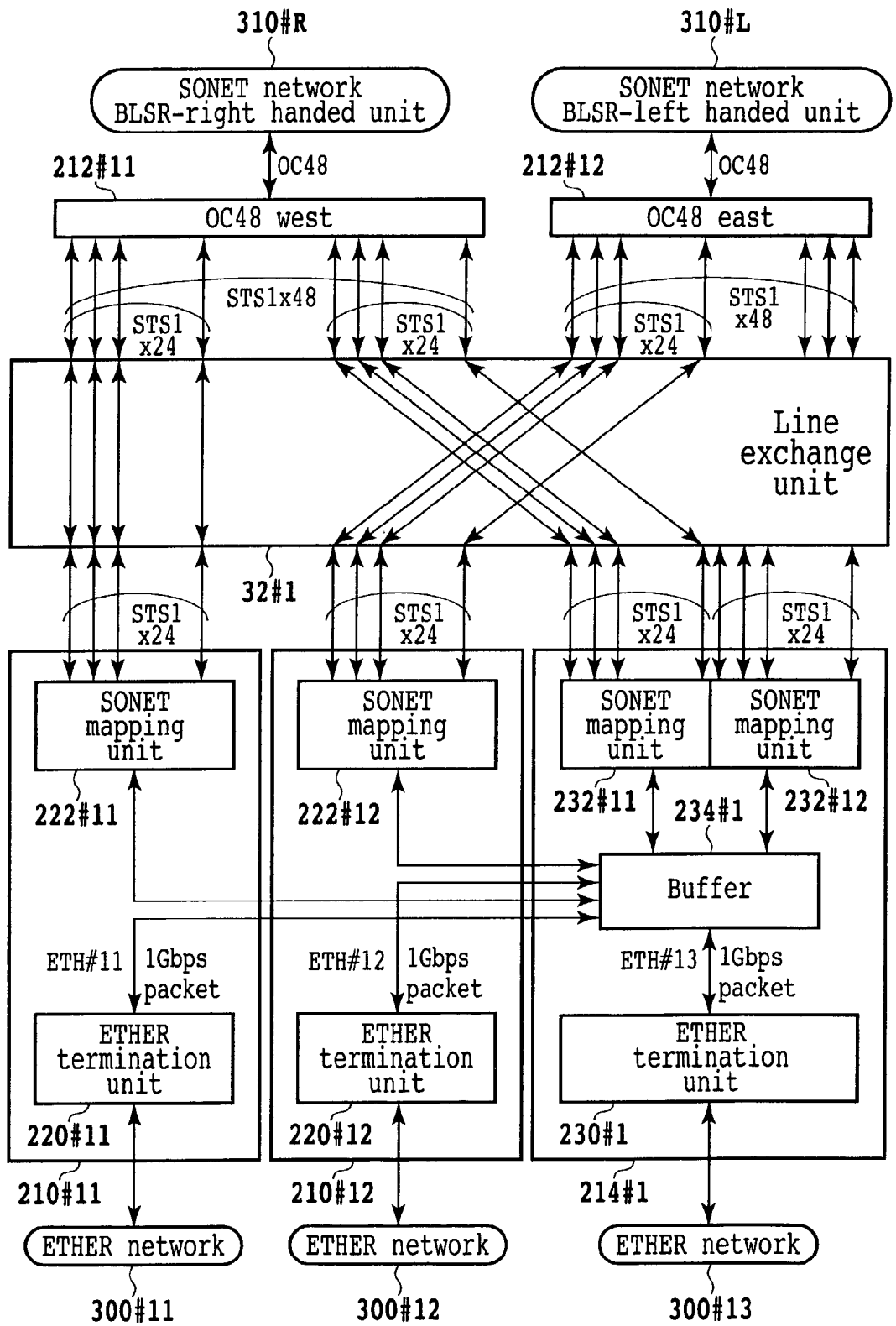
FIG. 9 is an explanatory diagram used for describing operations carried out by an NE 200#1 in a normal condition.

FIG. 9 is an explanatory diagram used for describing operations carried out by the NE 200#1 in a normal condition. A packet received by the ETHER termination unit 220#11 from an ETHER network 300#11 is supplied to the SONET mapping unit 222#11 either by way of the buffer 234#1 or directly. The SONET mapping unit 222#11 maps the packet onto an STS1X 24 frame, and outputs the frame to the line exchange unit 32#1. A packet received by the ETHER termination unit 220#12 from an ETHER network 300#12 is supplied to the SONET mapping unit 222#12 either by way of the buffer 234#1 or directly. The SONET mapping unit 222#12 maps the packet onto an STS1X 24 frame, and outputs the frame to the line exchange unit 32#1. A packet received by the ETHER termination unit 230#1 from an ETHER network 300#13 is supplied to the SONET mapping unit 232#11 either by way of the buffer 234#1 or directly. The SONET mapping unit 232#11 maps the packet onto an STS1X 24 frame, and outputs the frame to the line exchange unit 32#1. The line exchange unit 32#1 carries out line exchange processing as shown in FIG. 9 in accordance with line setting.

Figure 10:
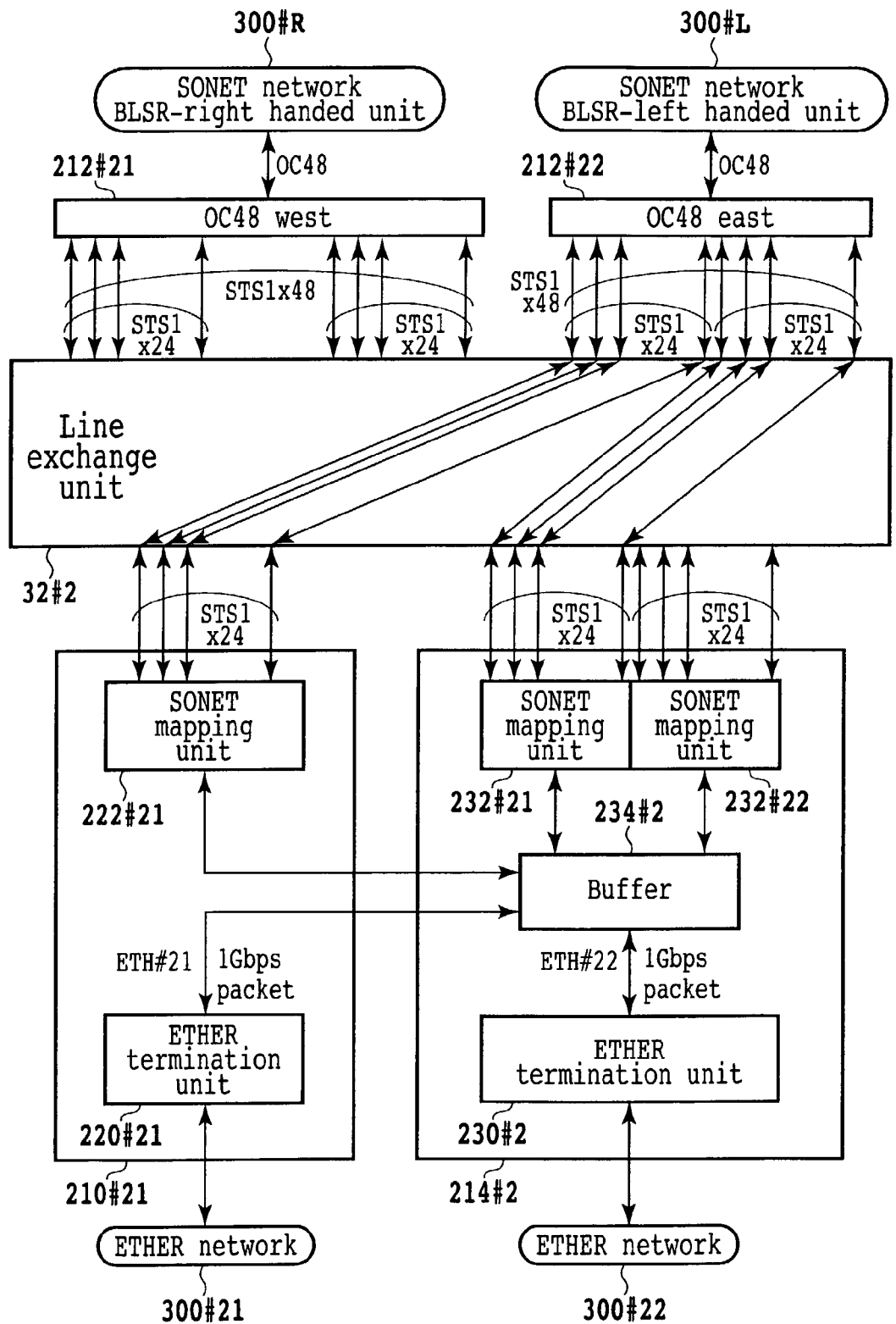
FIG. 10 is an explanatory diagram used for describing operations carried out by an NE 200#2 in a normal condition.

FIG. 10 is an explanatory diagram used for describing operations carried out by the NE 200#2 in a normal condition. A packet received by the ETHER termination unit 220#21 from the ETHER network 300#21 is supplied to the SONET mapping unit 222#21 either by way of the buffer 23442 or directly. The SONET mapping unit 222#21 maps the packet onto an STS1X 24 frame, and outputs the frame to the line exchange unit 32#2. A packet received by the ETHER termination unit 230#2 from the ETHER network 300422 is supplied to the SONET mapping unit 232421 either by way of the buffer 23442 or directly. The SONET mapping unit 232421 maps the packet onto an STS1X 24 frame, and outputs the frame to the line exchange unit 3242. The line exchange unit 3242 carries out line exchange processing as shown in FIG. 10 in accordance with line setting.

Figure 11:
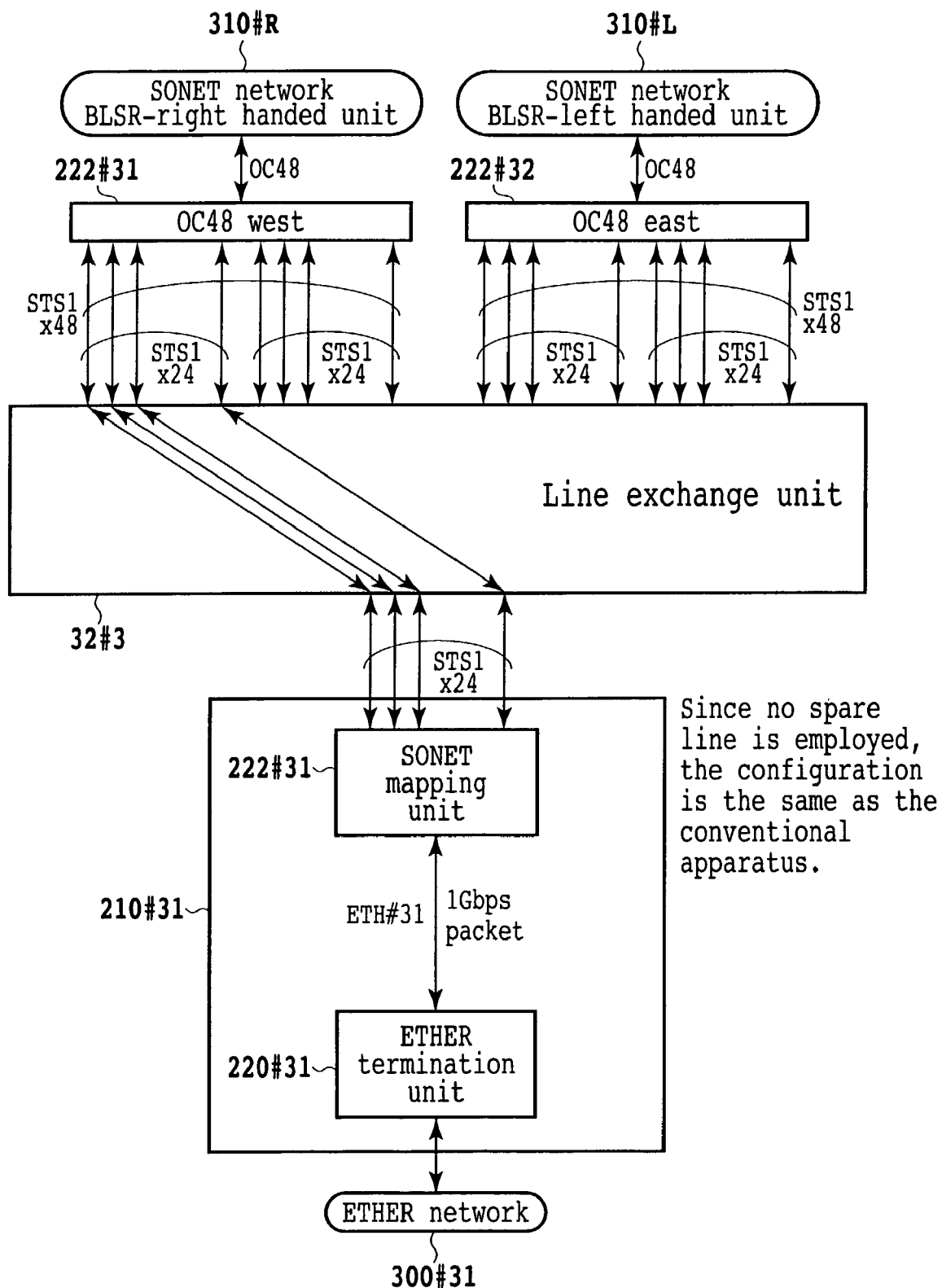
FIG. 11 is an explanatory diagram used for describing operations carried out by an NE 200#3 in a normal condition.

FIG. 11 is an explanatory diagram used for describing operations carried out by the NE 200#3 in a normal condition. A packet received by the ETHER termination unit 220#31 from the ETHER network 300#31 is supplied to the SONET mapping unit 222#31. The SONET mapping unit 222#31 maps the packet onto an STS1X 24 frame, and outputs the frame to the line exchange unit 32#3. The line exchange unit 32#3 carries out line exchange processing as shown in FIG. 11 in accordance with line setting.

(2): Operations Carried Out in the Event of a Line Failure

Figure 12:
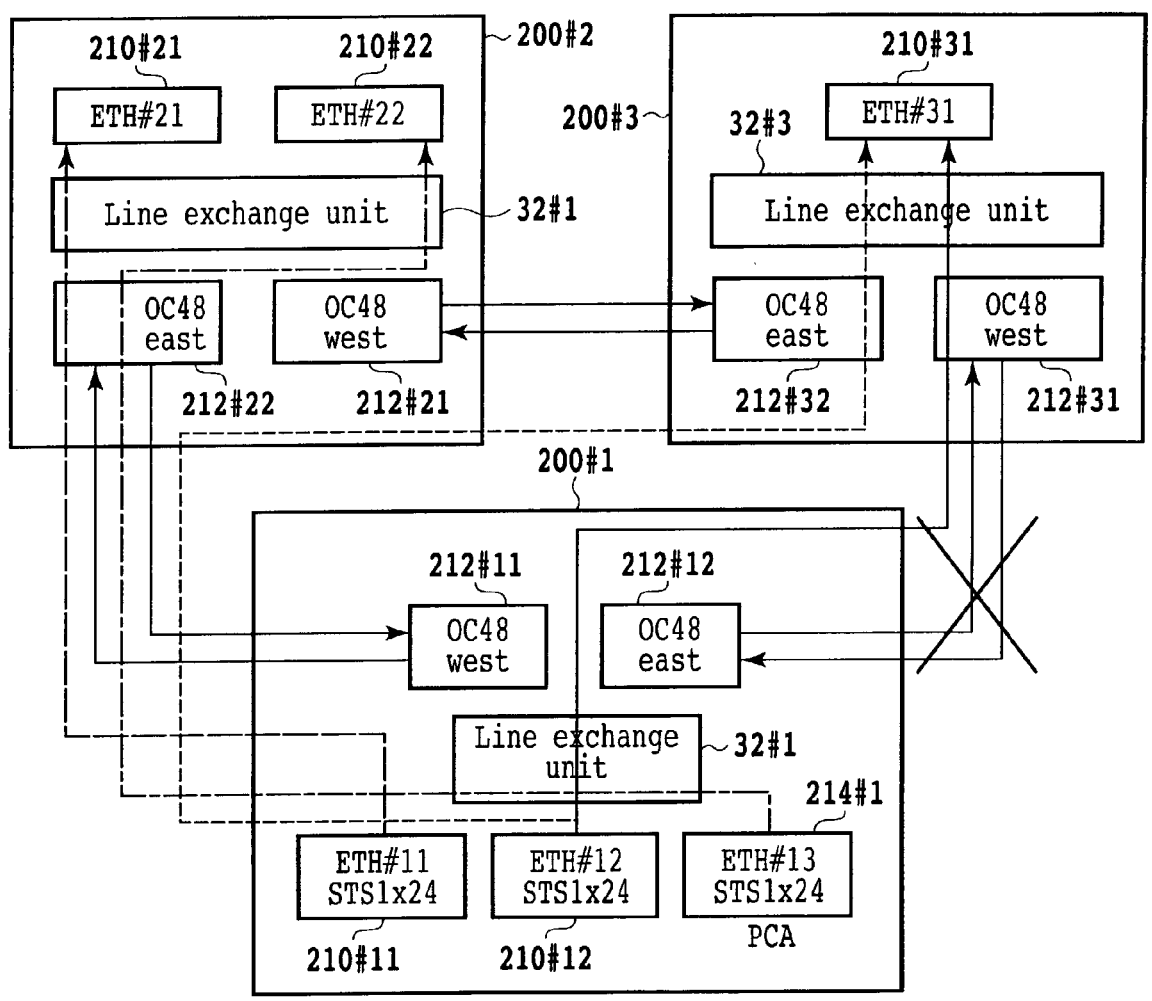
FIG. 12 is a diagram showing a route established in the event of a line failure.

FIG. 12 is a diagram showing a route established in the network shown in FIG. 2 in the event of a line failure. Assume that a line failure is detected on a line connecting the OC48 east 212#12 of the NE 200#1 to the OC48 west 212#31 of the NE 200#3 as indicated by a cross mark X shown in FIG. 12. When the NEs 200#1, 200#2 and 200#3 detect the line failure, routes 1, 2 and 3 are switched as shown in FIG. 12 in accordance with a BLSR recommendation as follows. Since route 1 is not affected by the line failure, route 1 remains the same as that for the normal state. That is to say, as shown by a broken line in FIG. 12, route 1 comprises a line between the ETHER interface unit 210#11 and the OC48 west 212#11, a line between the OC48 west 212#11 and the OC48 east 212#22 and a line between the OC48 east 212#22 and the ETHER interface unit 210#21. As shown by a dotted line in FIG. 12, on route 2, a signal is cut off between the OC48 east 212#12 and the OC48 west 212#31. Thus, route 2 is newly established to comprise a line between the ETHER interface unit 210#12 and the OC48 west 212#11, a line between the OC48 west 212#11 and the OC48 east 212#22, a line between the OC48 east 212#22 and the OC48 west 212#21, a line between the OC48 west 212#21 and the OC48 east 212#32 and a line between the OC48 east 212#32 and the ETHER interface unit 210#31. As shown by a single-dotted chain line in FIG. 12, on route 3, effects by the line failure are shared with the ETHER interface unit 210#12. Thus, much like that of the normal state, route 3 comprises a line between the ETHER interface unit 214#1 and the OC48 west 212#11, a line between the OC48 west 212#11 and the OC48 east 212#22 and a line between the OC48 east 212#22 and the ETHER interface unit 210#22.

Figure 13:
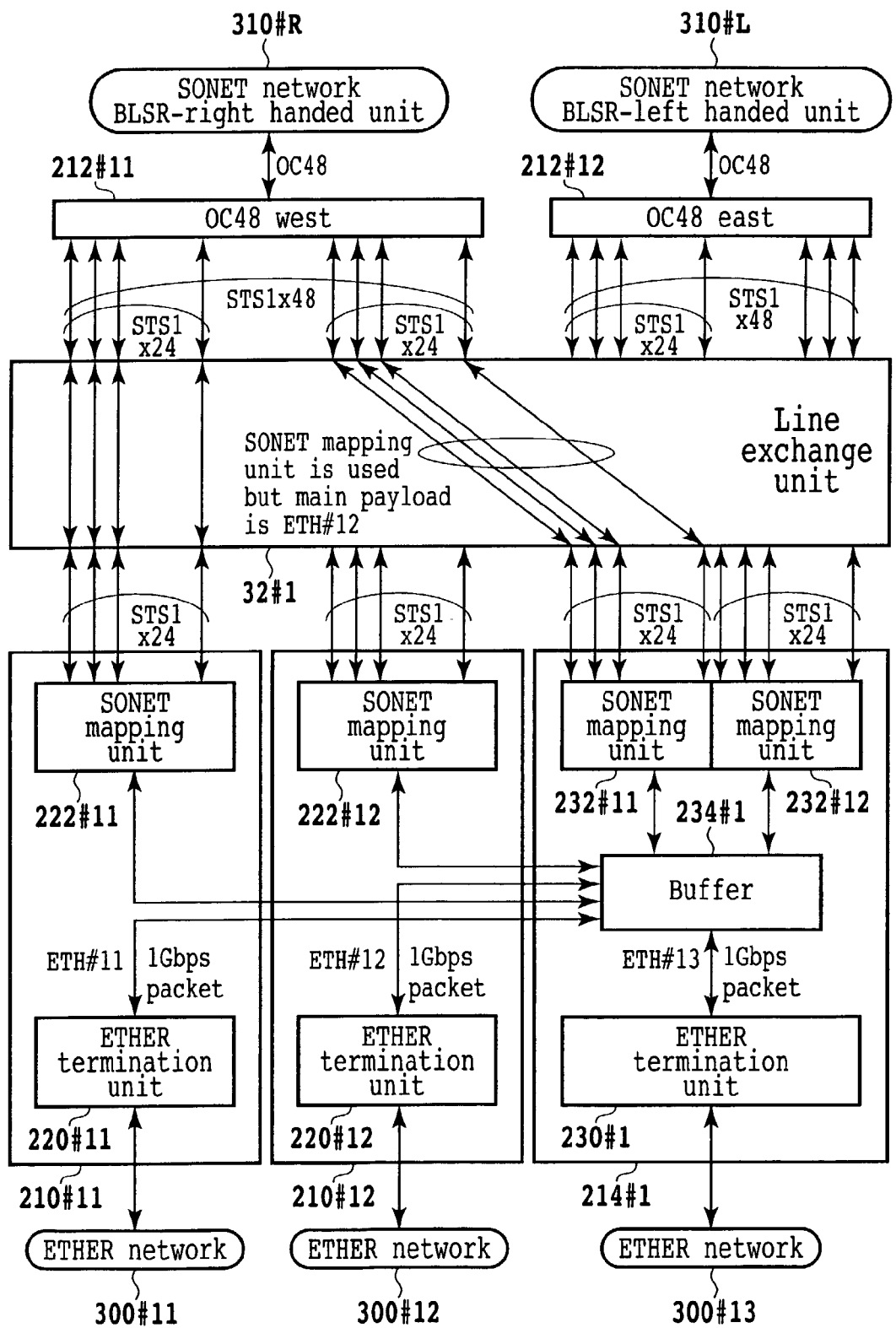
FIG. 13 is an explanatory diagram used for describing operations carried out by the NE 200#1 in the event of a line failure.
Figure 14:
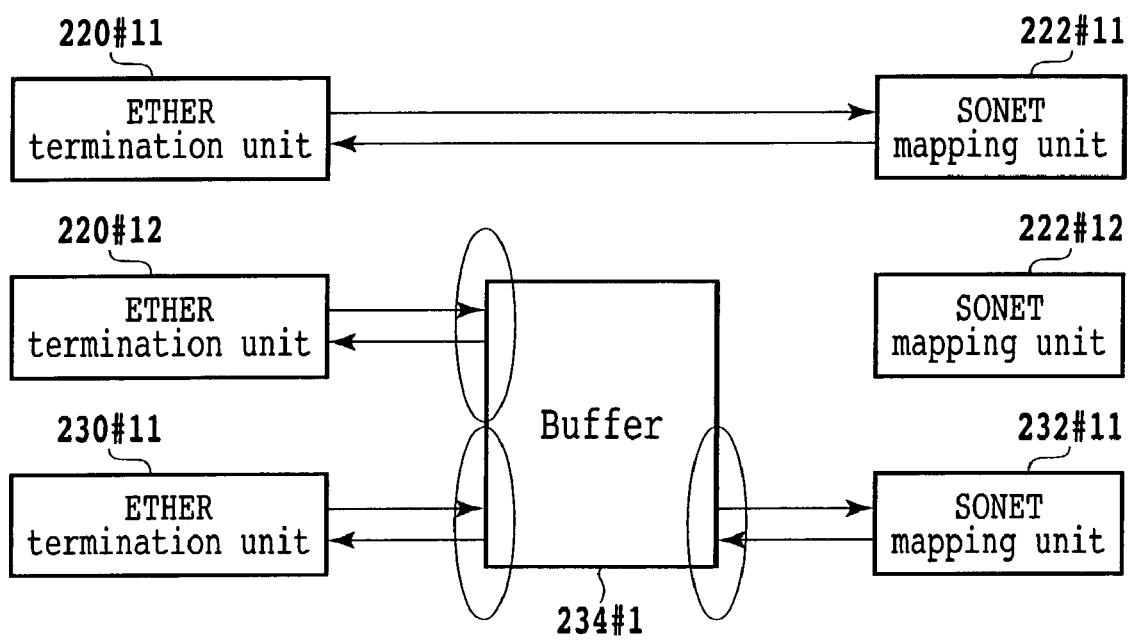
FIG. 14 is a diagram showing a technique to share a line.

FIG. 13 is an explanatory diagram used for describing operations carried out by the NE 200#1 in the event of a line failure. FIG. 14 is a diagram showing a technique to share a line. A packet received by the ETHER termination unit 220#12 from the ETHER network 300#12 includes an additional identifier for identifying the ETHER termination unit 220#12 as shown in FIG. 5 and is stored in the buffer 234#1 as shown in FIG. 14. On the other hand, a packet received by the ETHER termination unit 230#1 from the ETHER network 300#13 includes an additional identifier for identifying the ETHER termination unit 230#1 and is stored in the buffer 234#1. For each identifier, the number of packets read out from the buffer 234#1 is counted to form a judgment as to whether or not the throughput has exceeded an upper limit for the identifier. If the throughput has exceeded an upper limit, the packet is output to the SONET mapping unit 232#11 in accordance with the control executed on a priority basis as described above. The SONET mapping unit 232#11 maps the packet onto an STS1X 24 frame, which is subjected to line exchange processing to the OC48 west 212#11 in the line exchange unit 32#1.

Figure 15:
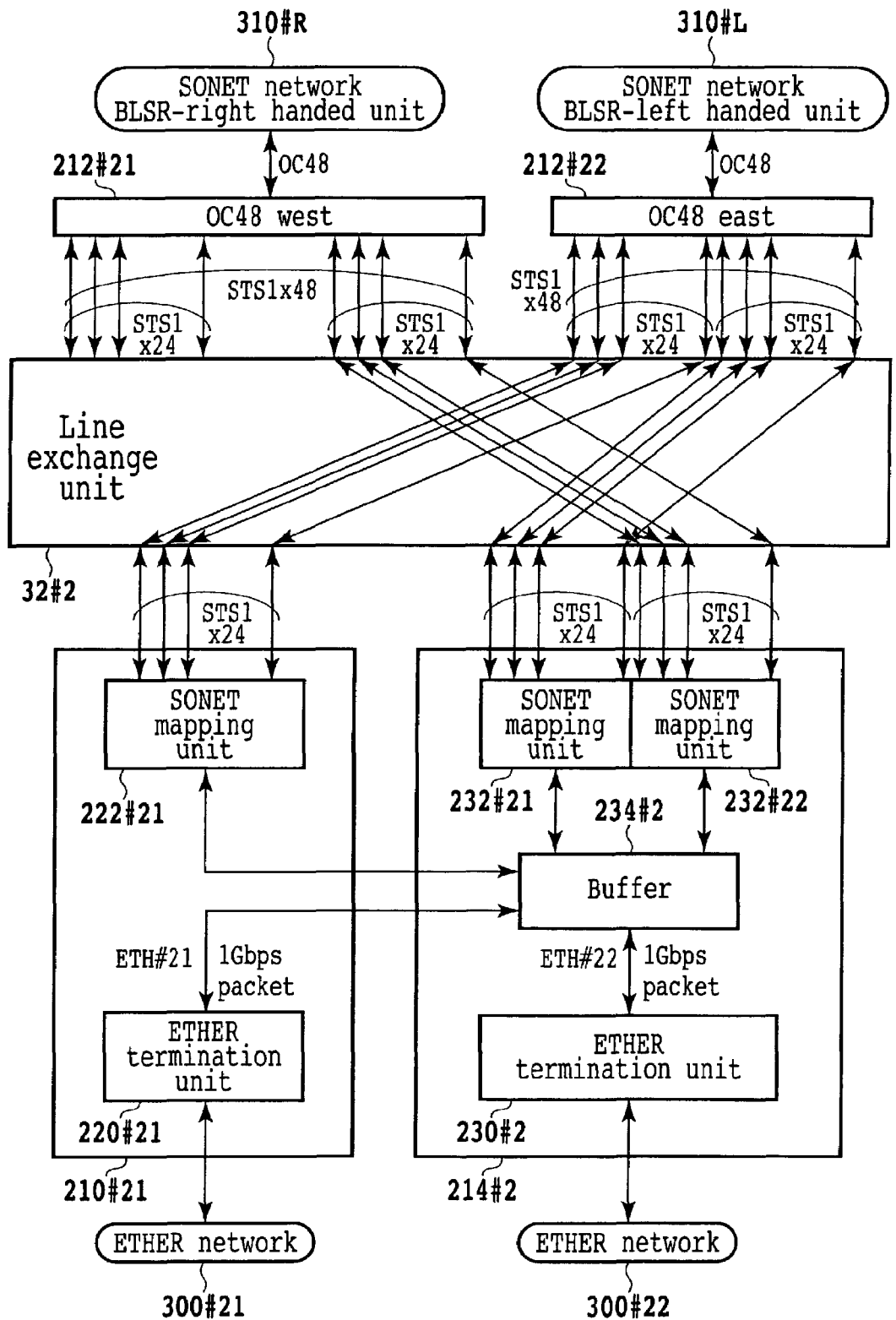
FIG. 15 is an explanatory diagram used for describing operations carried out by the NE 200#2 in the event of a line failure.
Figure 16:
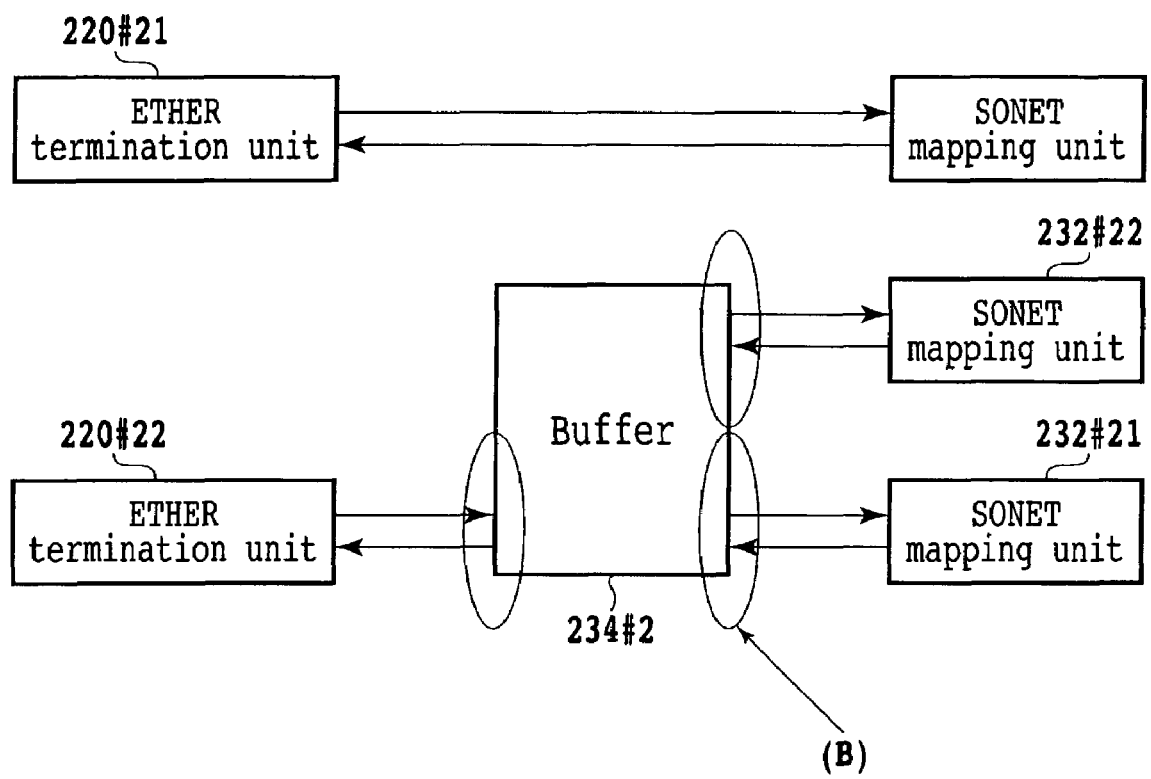
FIG. 16 is a diagram showing a technique to share a line.

FIG. 15 is an explanatory diagram used for describing operations carried out by the NE 200#2 in the event of a line failure. FIG. 16 is a diagram showing a technique to share a line. The OC48 east 212#22 separates an STS1X 48 frame from an OC48 packet received from the SONET network-BLSR left handed unit 310#L, and the line exchange unit 32#2 supplies the STS1X 24 frame to the SONET mapping unit 232#21. The SONET mapping unit 232#21 demaps the STS1X 48 frame back onto a packet, which is then stored in the buffer 234#2. The additional identifier included in the packet stored in the buffer 234#2 is examined to form a judgment as to whether or not the flow of the packet is to be terminated at the ETHER termination unit 230#2. If the flow of the packet is to be terminated at the ETHER termination unit 230#2, the packet is output to the ETHER termination unit 230#2 with the identifier removed. If the flow of the packet is not to be terminated at the ETHER termination unit 230#2, on the other hand, the packet is output to the SONET mapping unit 232#22 with the identifier kept in the packet. The packet is mapped by the SONET mapping unit 232#22 onto an STS1X 24 frame, which is then subjected to line exchange processing to the OC48 west 212#21 in the line exchange unit 32#2.

Figure 17:
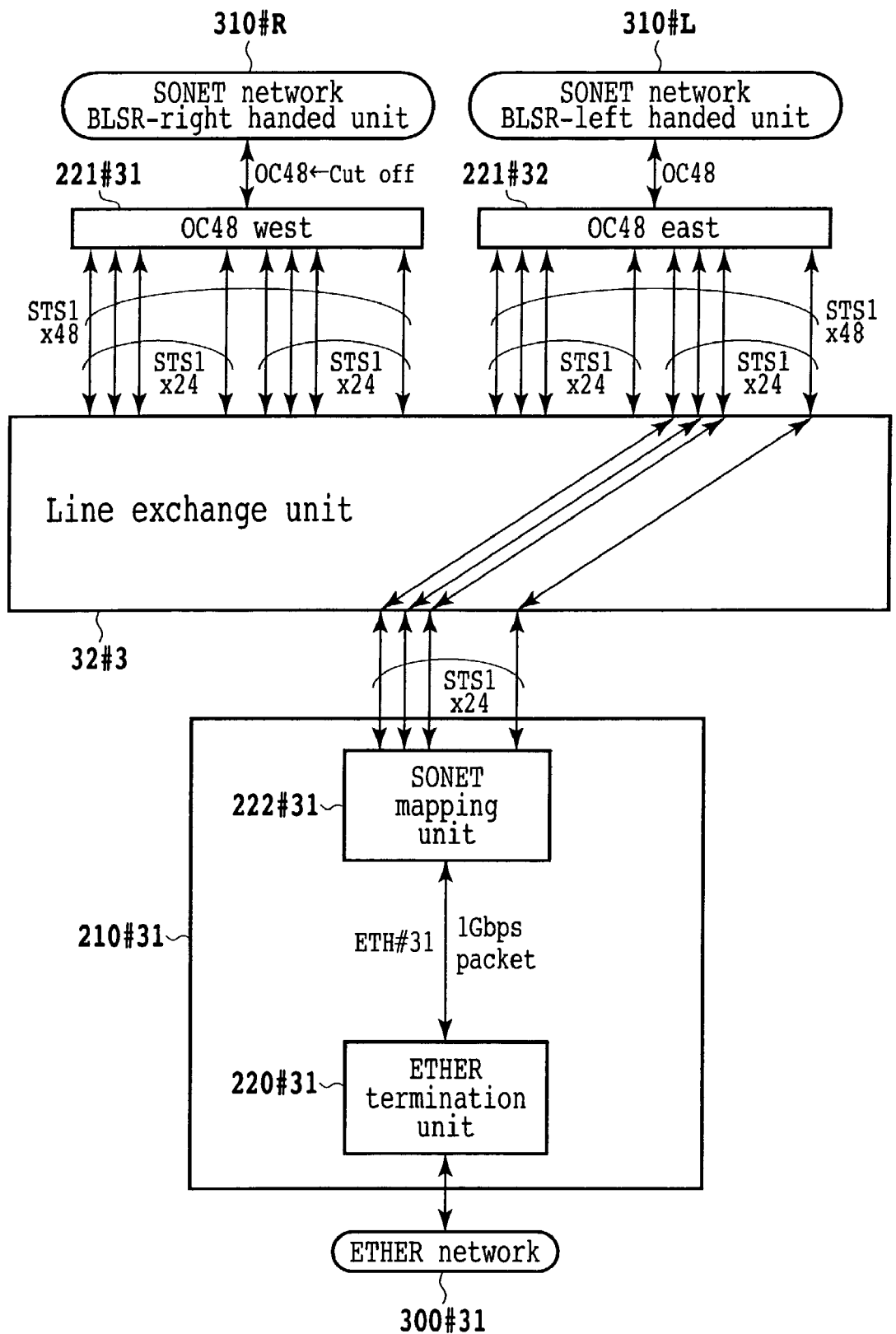
FIG. 17 is an explanatory diagram used for describing operations carried out by the NE 200#3 in the event of a line failure.

FIG. 17 is an explanatory diagram used for describing operations carried out by the NE 200#3 in the event of a line failure. Since the NE 200#3 does not employ a spare line, the operations are the same as the conventional transmission apparatus. That is to say, the OC48 east 221#32 separates an STS1X 24 frame from an OC48 packet received from the SONET network-BLSR left handed unit 310#L, which has received the packet from the ETHER network 300#31 through the ETHER termination unit 220#31. The STS1X 24 frame is supplied to the line exchange unit 32#3. The line exchange unit 32#3 then supplies the STS1X 24 frame received from the OC48 east 221#32 to the ETHER interface unit 210#31 in accordance with line switching.

It is to be noted that, even when a plurality of line failures occur, lines are shared by one of a plurality of presently used lines and a spare line. In the embodiment described above, in the case of the BLSR switching technique, a line is shared by a PCA line and a switched route. Thus, the efficiency of the line utilization can be improved. In this embodiment, the BLSR switching technique is adopted. However, the present invention can also be applied to an UPSR switching technique. In addition, the present invention can also be applied to transmissions of data information with the connectionless type through SONET such as Packet over SONET, ATM over SONET, ETHER over SONET or IP over SONET. In addition, in the transmission apparatus, by merely connecting an audio interface unit, which is used for terminating an audio network and accommodating audio information received from the audio network in a SONET/SDH frame, to a line exchange unit, it is possible to construct a SONET/SDH network in which audio signals and data signals coexist without modifying other configurations at all.

Second Embodiment

Figure 18:
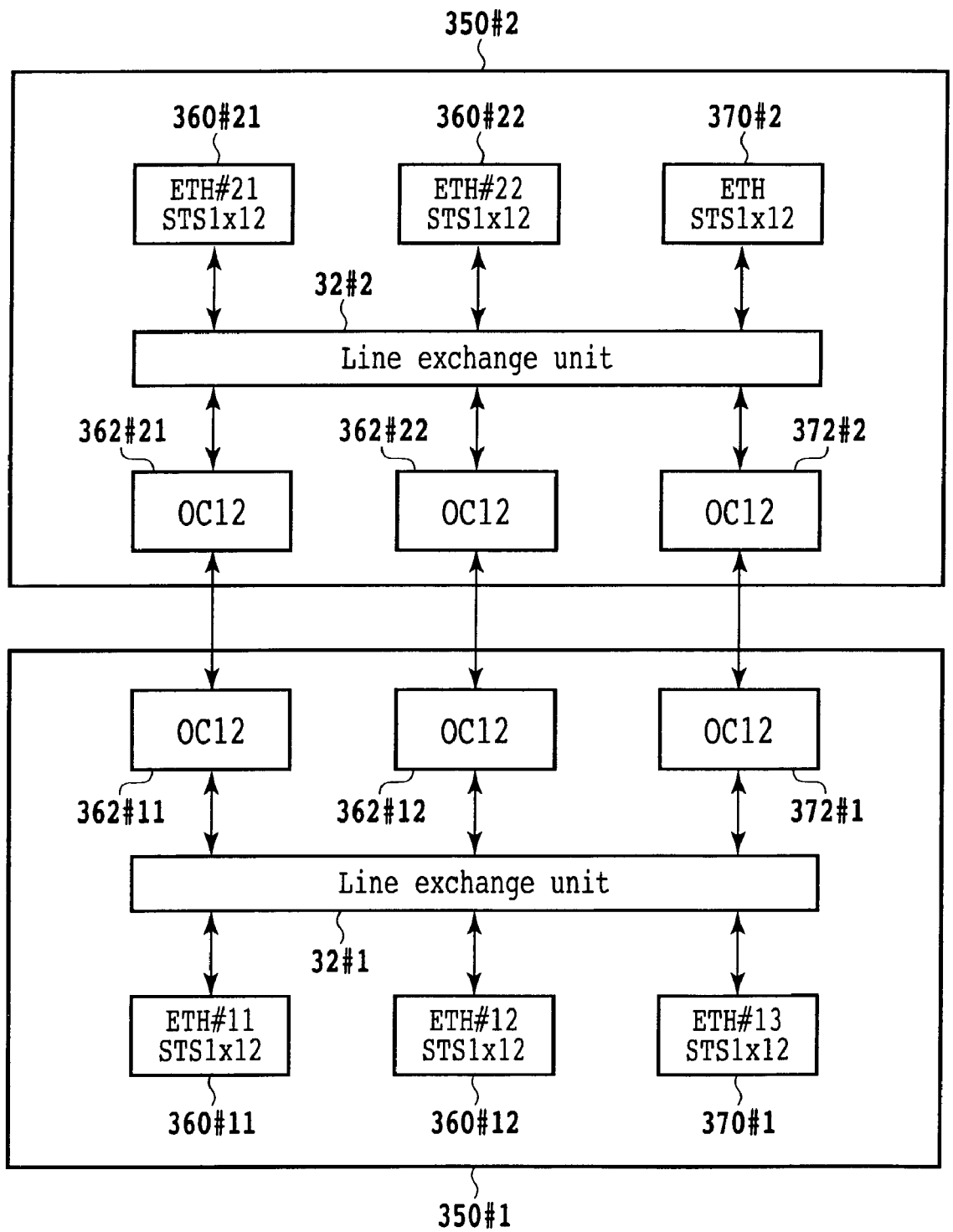
FIG. 18 is a block diagram showing the configuration of a network implemented by a second embodiment of the present invention.

FIG. 18 is a block diagram showing the configuration of a network adopting an 1:N (APS) technique in accordance with a second embodiment of the present invention. A typical case for which N=2 is explained. It is to be noted that, by setting N at 1, the configuration shown in FIG. 18 can be applied to an APS (1+1) configuration. As shown in FIG. 18, ETHER interface units 360#1j where j=1 and 2 are connected to ETHER interface units 360#2j where j=1 and 2 by OC12 interface units 362#1j where j=1 and 2 and 362#2j where j=1 and 2. OC12 interface units 370#1 and 370#2 are each a spare line. In the case of this embodiment, however, the OC12 interface units 370#1 and 370#2 are used for communications in a normal state in order to increase the efficiency of the line utilization. In the event of a line failure occurring on any one of lines between the OC12 interface units 362#1j where j=1 and 2 and the OC12 interface units 362#2j where j=1 and 2, a line is shared by the ETHER interface units 370#1 and 370#2 and ETHER interface units 360#1j and 360#2j.

Figure 19:
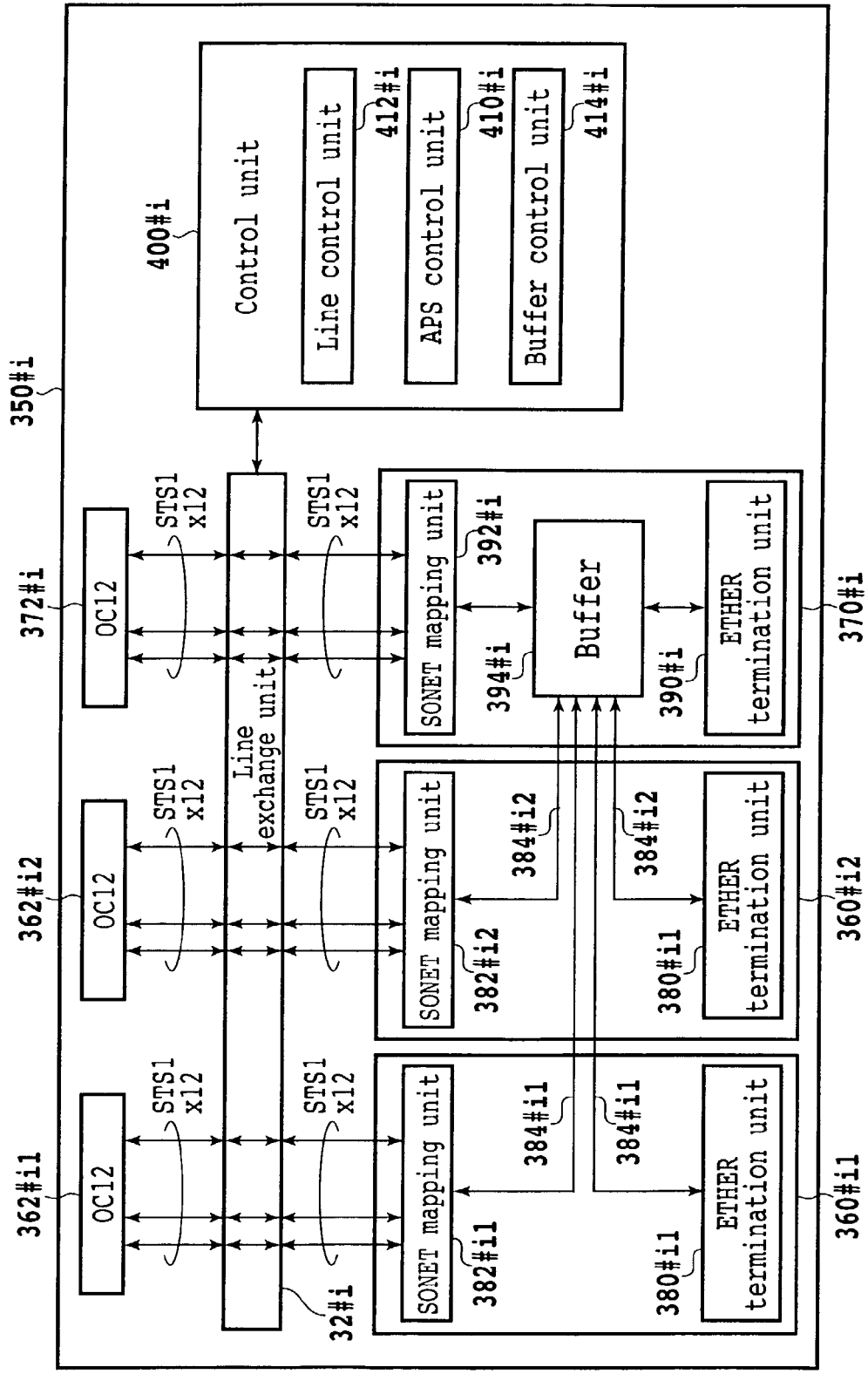
FIG. 19 is a block diagram showing the configuration of an NE used in the network shown in FIG. 18.

FIG. 19 is a block diagram showing the configuration of the NE 350#i used in the network shown in FIG. 18. ETHER termination units 380#ij where j=1 and 2 and 390#i are each essentially identical with the ETHER termination unit 220#ijk employed in the NE shown in FIG. 3. SONET mapping units 382#ij where j=1 and 2 and 392#i are each essentially identical with the SONET mapping unit 222#ijk employed in the NE shown in FIG. 3 except that the SONET mapping units 382#ij where j=1 and 2 and 392#i each map a packet onto an STS1X 12 frame instead of an STS1X 24 frame. A buffer 394#i is essentially identical with the buffer 234#i employed in the NE shown in FIG. 3. A control unit 400#i has an APS control unit 410#i, a line control unit 412#i and a buffer control unit 414#i. Basic operations of the control unit 400#i are essentially identical with those of the control unit 218#i employed in the NE shown in FIG. 3 except that the adopted switching technique is an APS technique instead of the BLSR technique.

The operations of the network shown in FIG. 18 are explained as follows.

(1): Normal Operations

Figure 20:
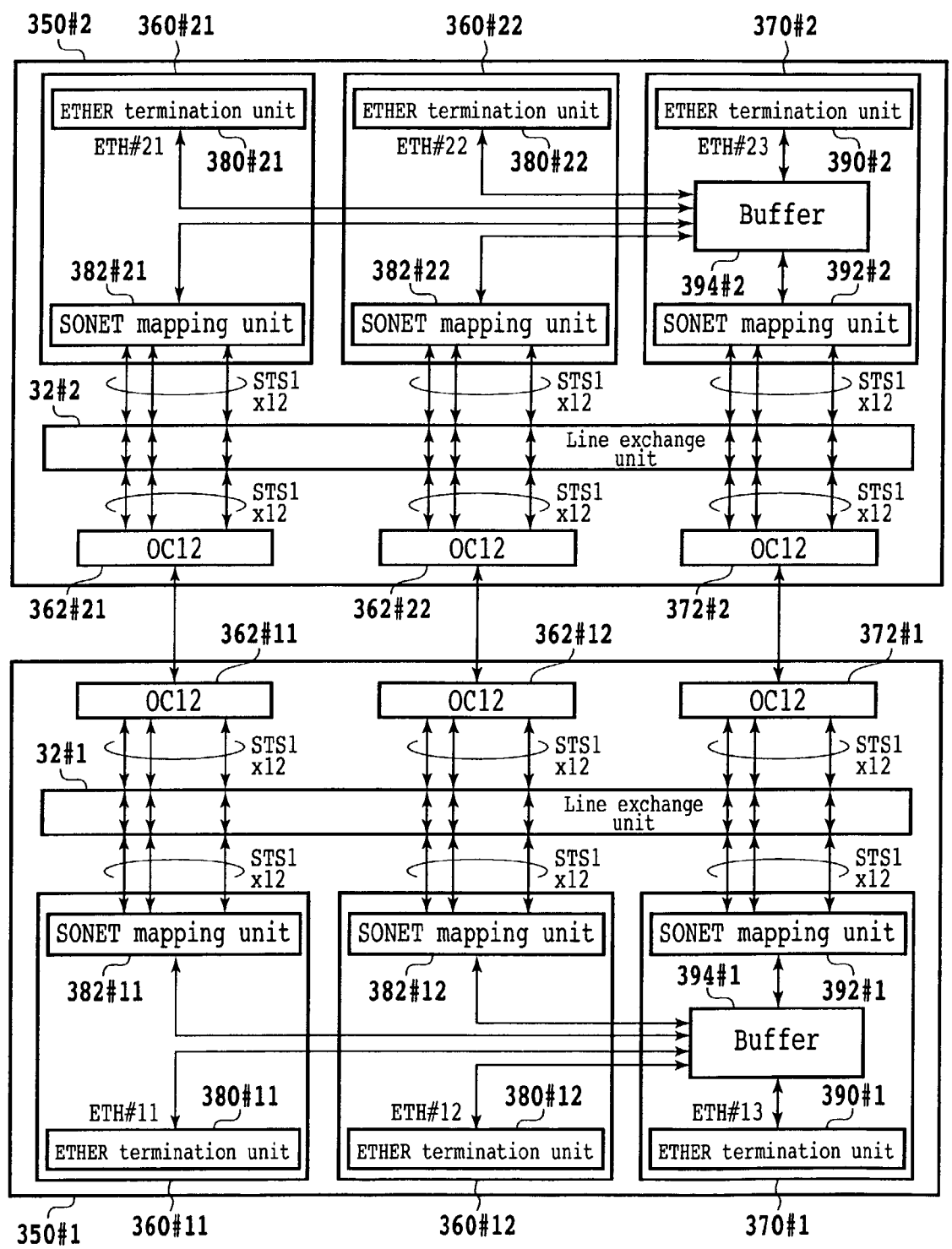
FIG. 20 is an explanatory diagram used for describing operations carried out in the network shown in FIG. 18 a normal condition.

FIG. 20 is an explanatory diagram used for describing operations carried out in the network shown in FIG. 18 in a normal condition. As shown in FIG. 20, there are established routes comprising lines between the ETHER interface units 360 #1j where j=1 and 2 and the OC12 interface units 362#1j where j=1 and 2, lines between the OC12 interface units 362#1j where j=1 and 2 and the OC12 interface units 362#2j where j=1 and 2 and lines between the OC12 interface units 362#2j where j=1 and 2 and the ETHER interface units 360#2j where j=1 and 2.

(2): Operations Carried Out in the Event of a Line Failure

Figure 21:
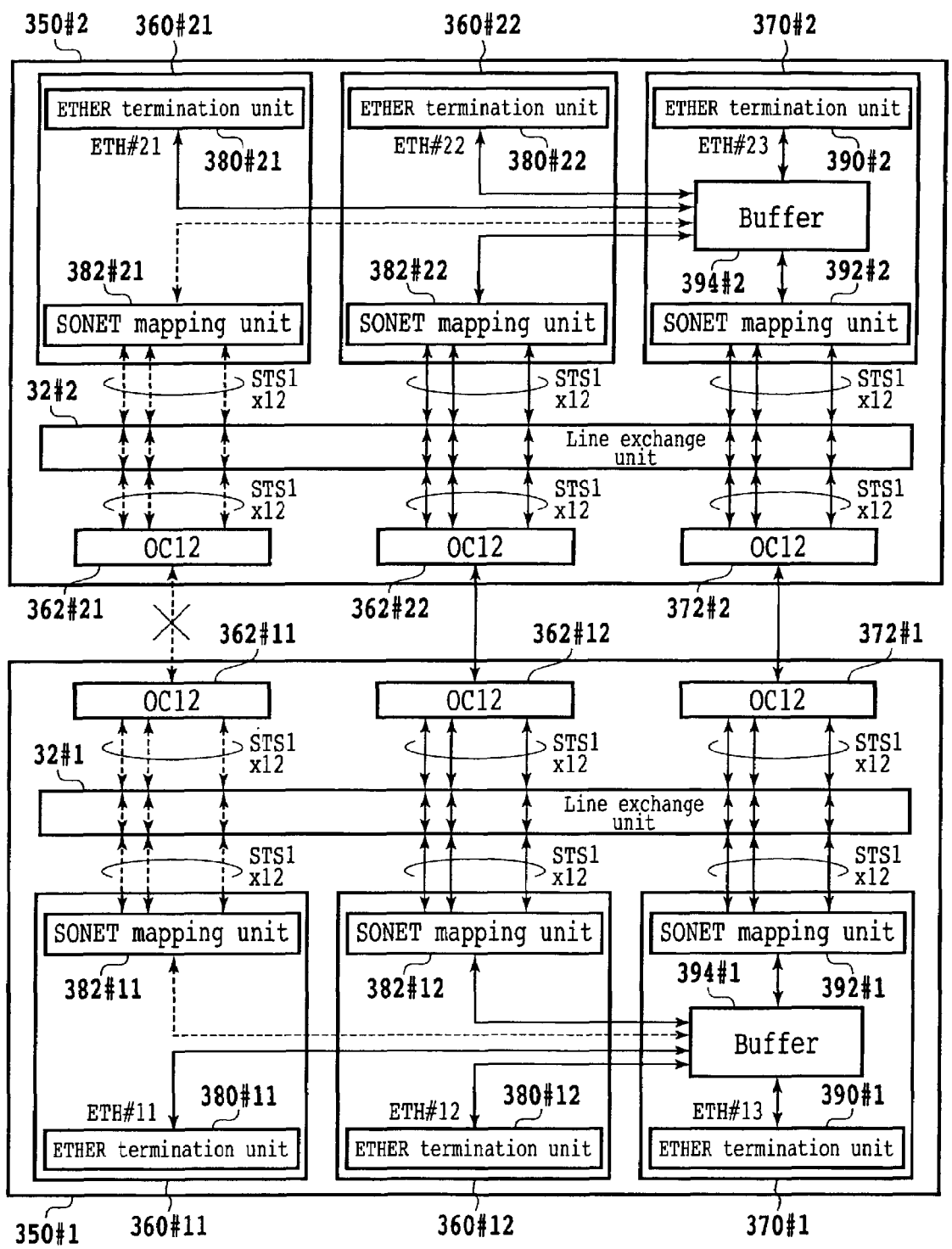
FIG. 21 is an explanatory diagram used for describing operations carried out in the network shown in FIG. 18 in the event of a line failure.
Figure 22:
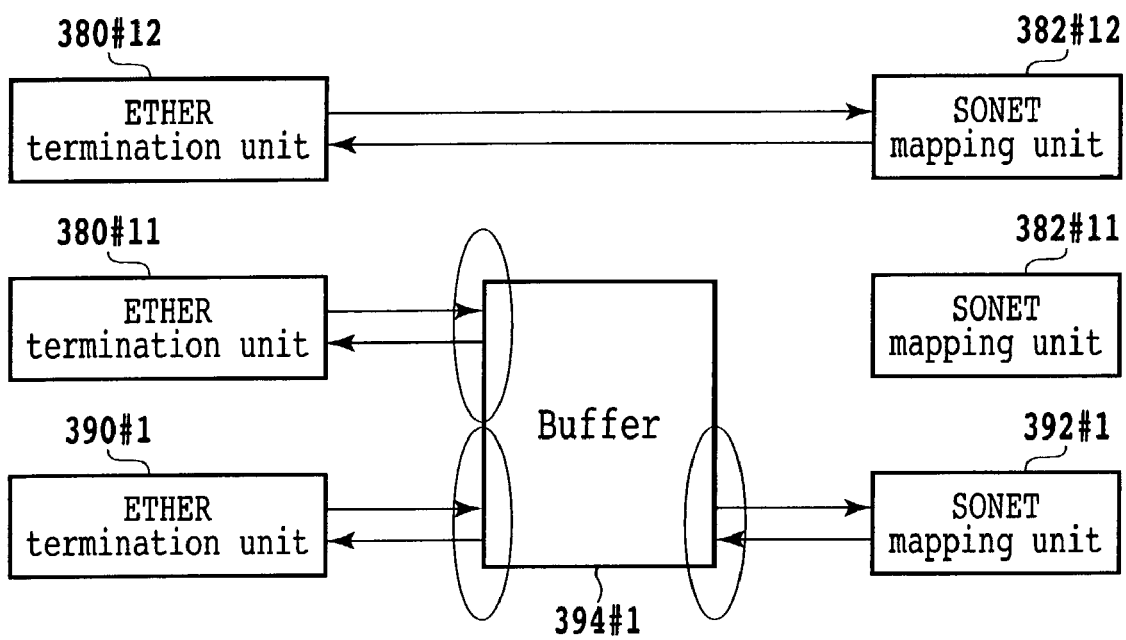
FIG. 22 is a diagram showing a technique to share a line.

FIG. 21 is an explanatory diagram used for describing operations carried out in the network shown in FIG. 18 in the event of a line failure. As indicated by a cross mark X in FIG. 21, a line failure is detected on a line between the OC12 interface unit 362#11 and the OC12 interface unit 362#21. FIG. 22 is a diagram showing a technique to share a line. The control unit 400#1 adds an identifier to each of packets output by the ETHER termination units 380#11 and 390#1 before storing the packets into the buffer 394#1. Subsequently, a packet is read out from the buffer 394#1 and output to the SONET mapping unit 392#1, which then maps the packet onto an STS1X 12 frame. The STS1X 12 frame is subjected to line exchange processing in the line exchange unit 32#1 and multiplexed in an OC12 packet, which is then supplied to the OC12 interface unit 372#2. The OC12 interface unit 372#2 separates the STS1X 12 frame from the OC12 packet. The STS1X 12 frame is subjected to line exchange processing in the line exchange unit 32#2 and supplied to the SONET mapping unit 392#2, which then demaps the frame onto the original packet. The packet is stored in the buffer 394#2 to be output later to the ETHER termination units 380#1j where j=1 and 2 with the identifiers removed.

Furthermore, if a line failure is also detected on a line between the OC12 interface unit 362#12 and the OC12 interface unit 362#22, communications through a spare line between OC12 interface unit 372#1 and 37242 are carried out, sharing the spare line by the line between the ETHER interface units 360#1*j* and 360#2*j* where j=1 and 2, and the line between the ETHER interface units 37041 and 37042 in order to improve the efficiency of the line utilization.

Third Embodiment

Figure 23:
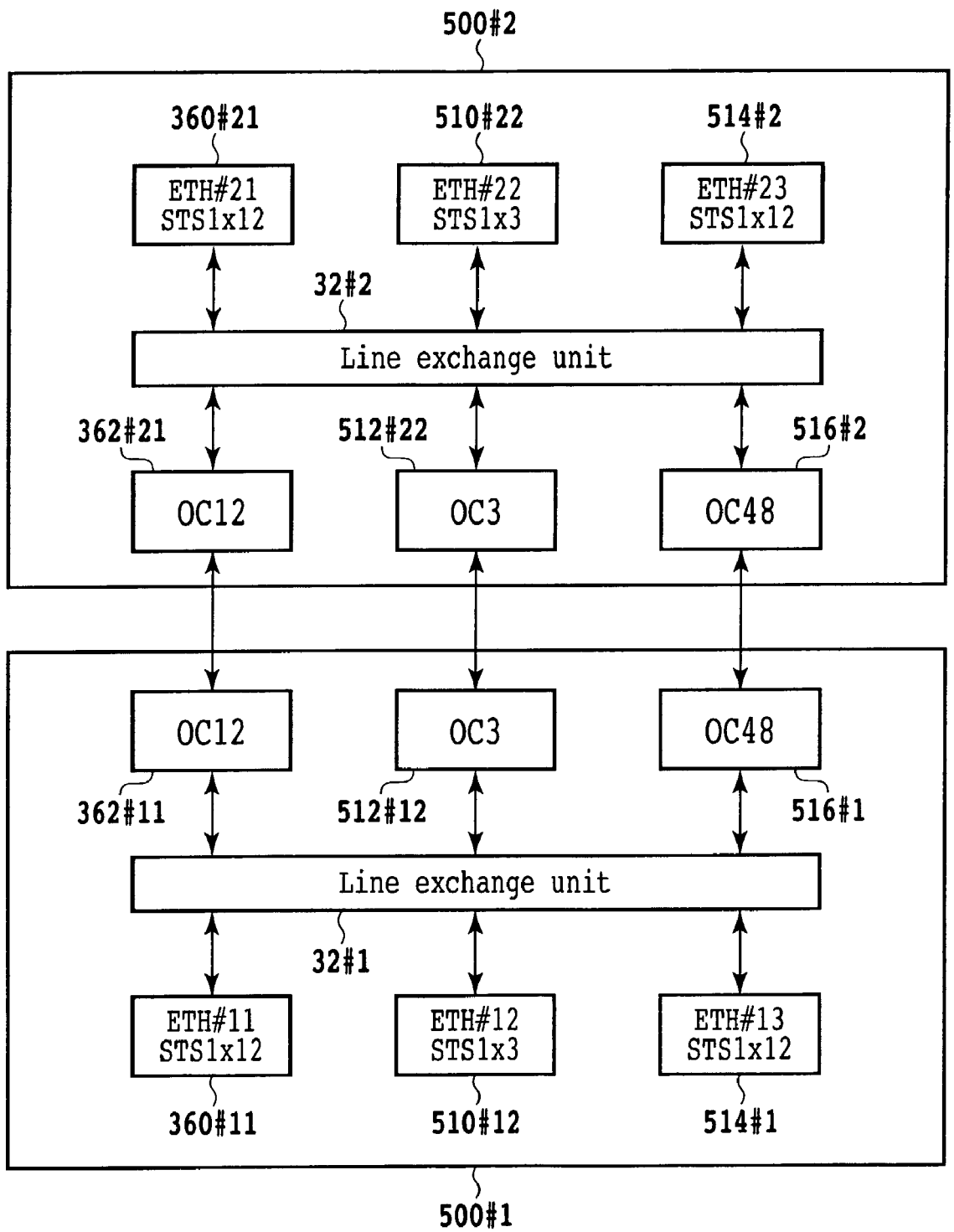
FIG. 23 is a block diagram showing the configuration of a network implemented by a third embodiment of the present invention.

FIG. 23 is a block diagram showing the configuration of a network adopting a 1:N (APS) technique in accordance with a third embodiment of the present invention. A typical case for which N=2 is explained. In the case of this embodiment, lines of the SONET network have different bands, namely, OC12, OC3 and OC48 bands. In addition, the OC48 band of a spare line is broader than the other OC12 and OC3 bands of presently used lines. In the event of a line failure, a spare line between an OC48 interface unit 514#1 and an OC48 interface unit 514#2 is shared by a route between ETHER interface units 360#1*j* and 360#2*j*, which is involved in the line failure, and a line between ETHER interface units 370#1 and 370#2. For this reason, a spare line with a broad bandwidth is used in order to prevent a packet from being discarded.

Figure 24:
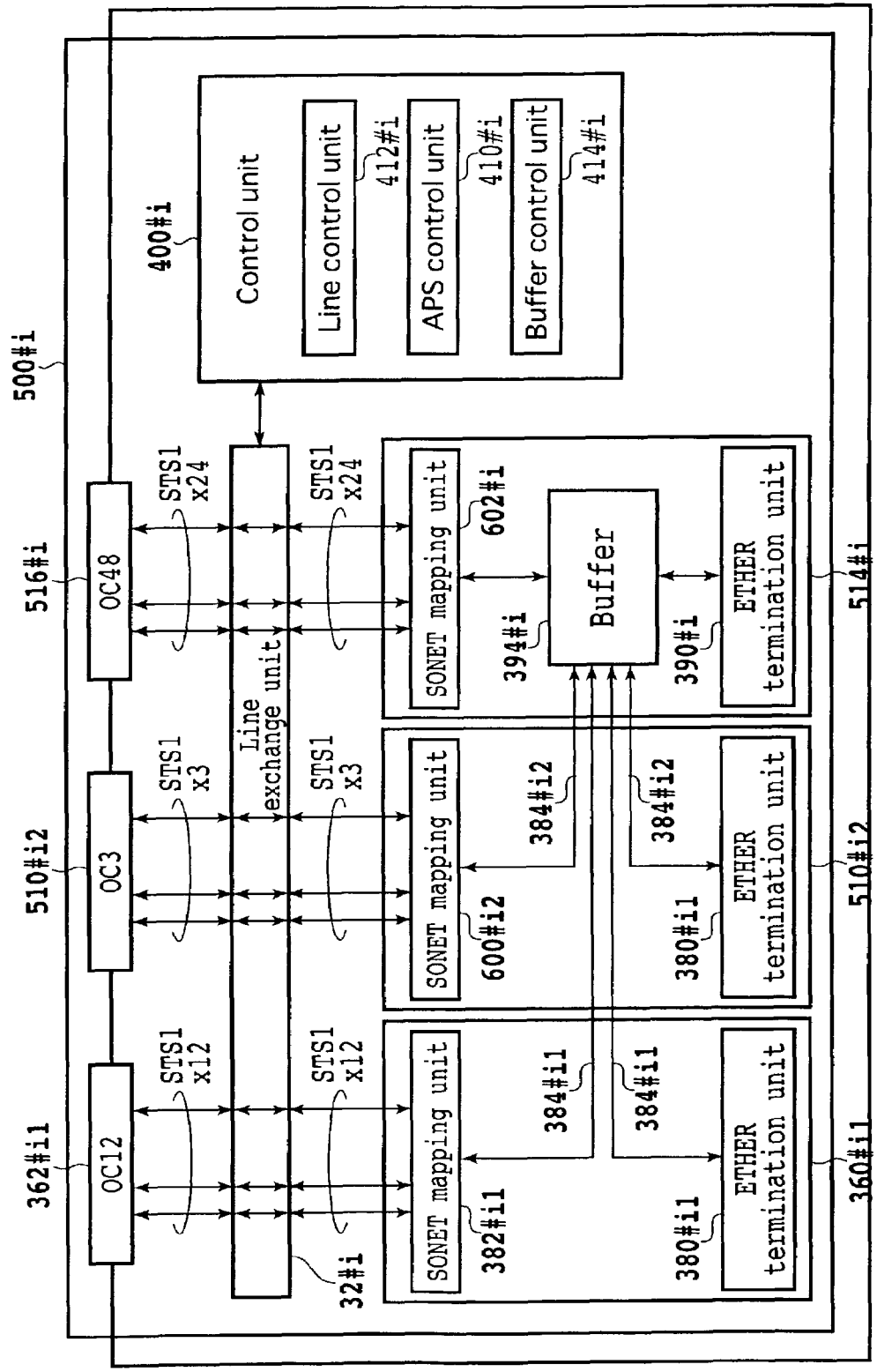
FIG. 24 is a block diagram showing the configuration of an NE used in the network shown in FIG. 23.
Figure 25:
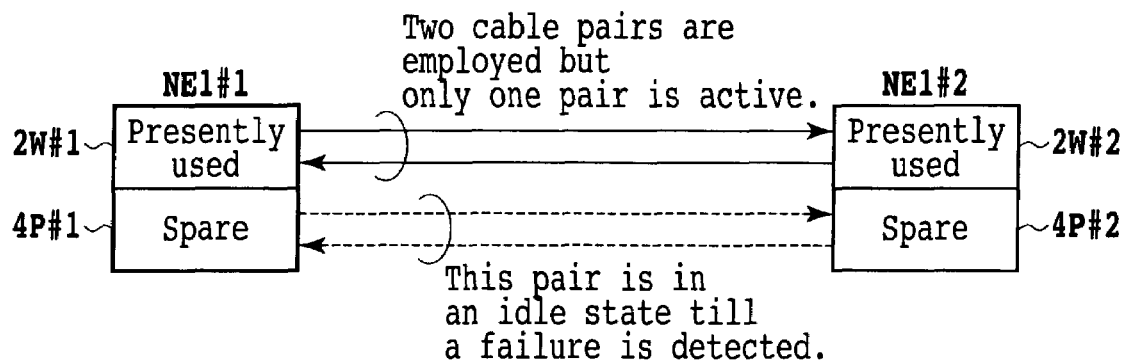
FIG. 25 is a diagram showing the conventional APS (1+1) technique.
Figure 26:
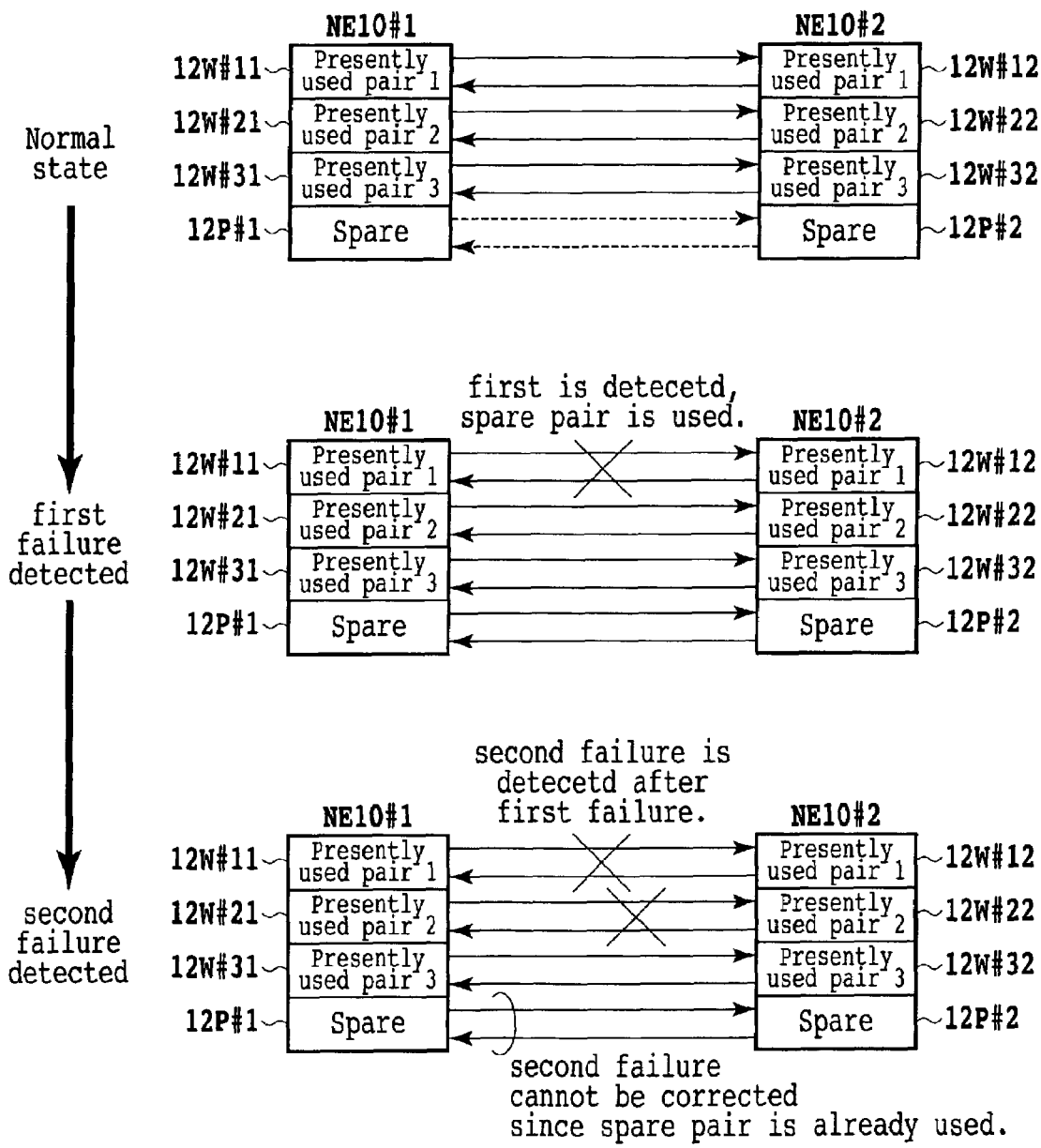
FIG. 26 is a diagram showing the conventional APS (1:2) technique.
Figure 27:
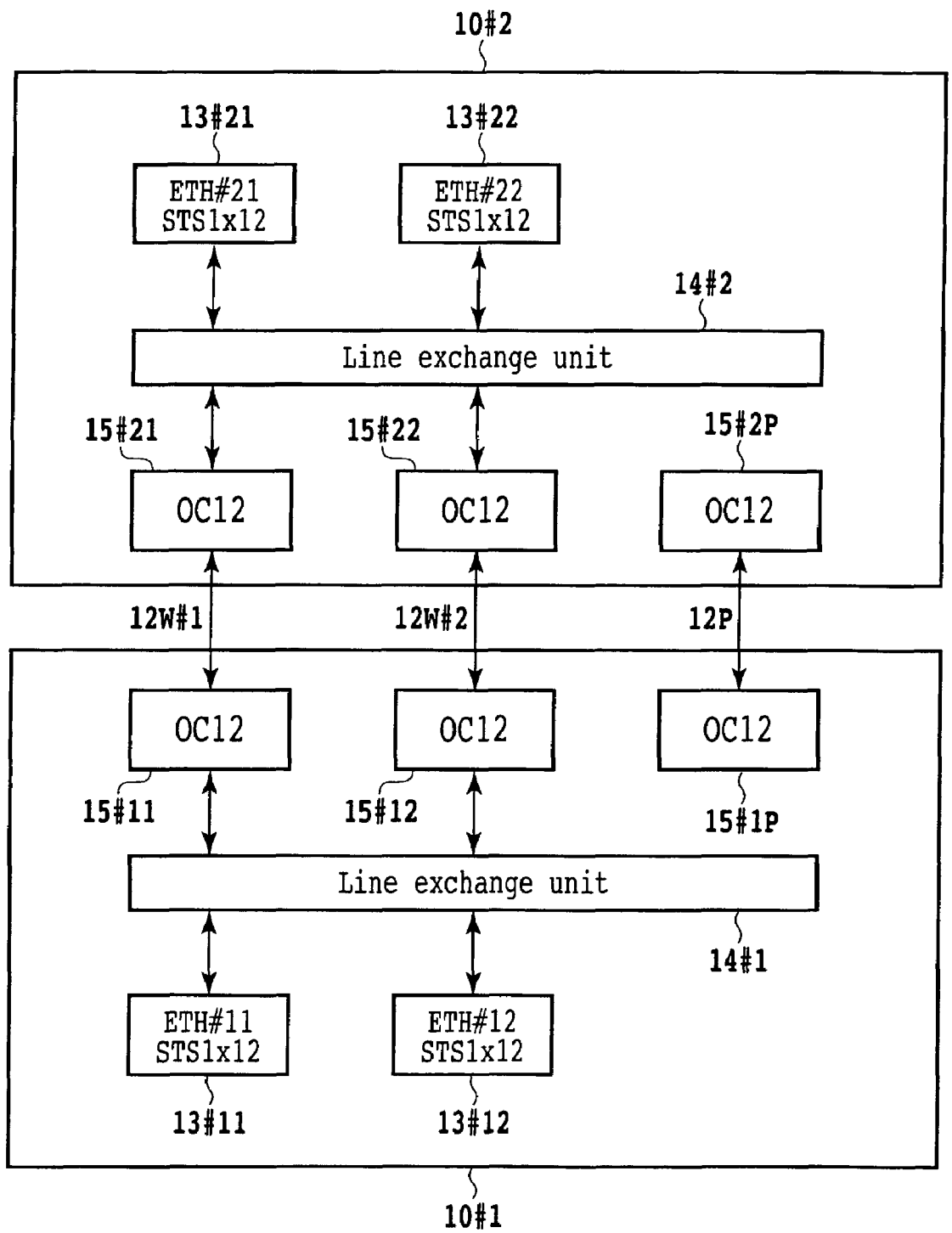
FIG. 27 is a block diagram showing the configuration of a network adopting the conventional APS (1:2) technique.
Figure 28:
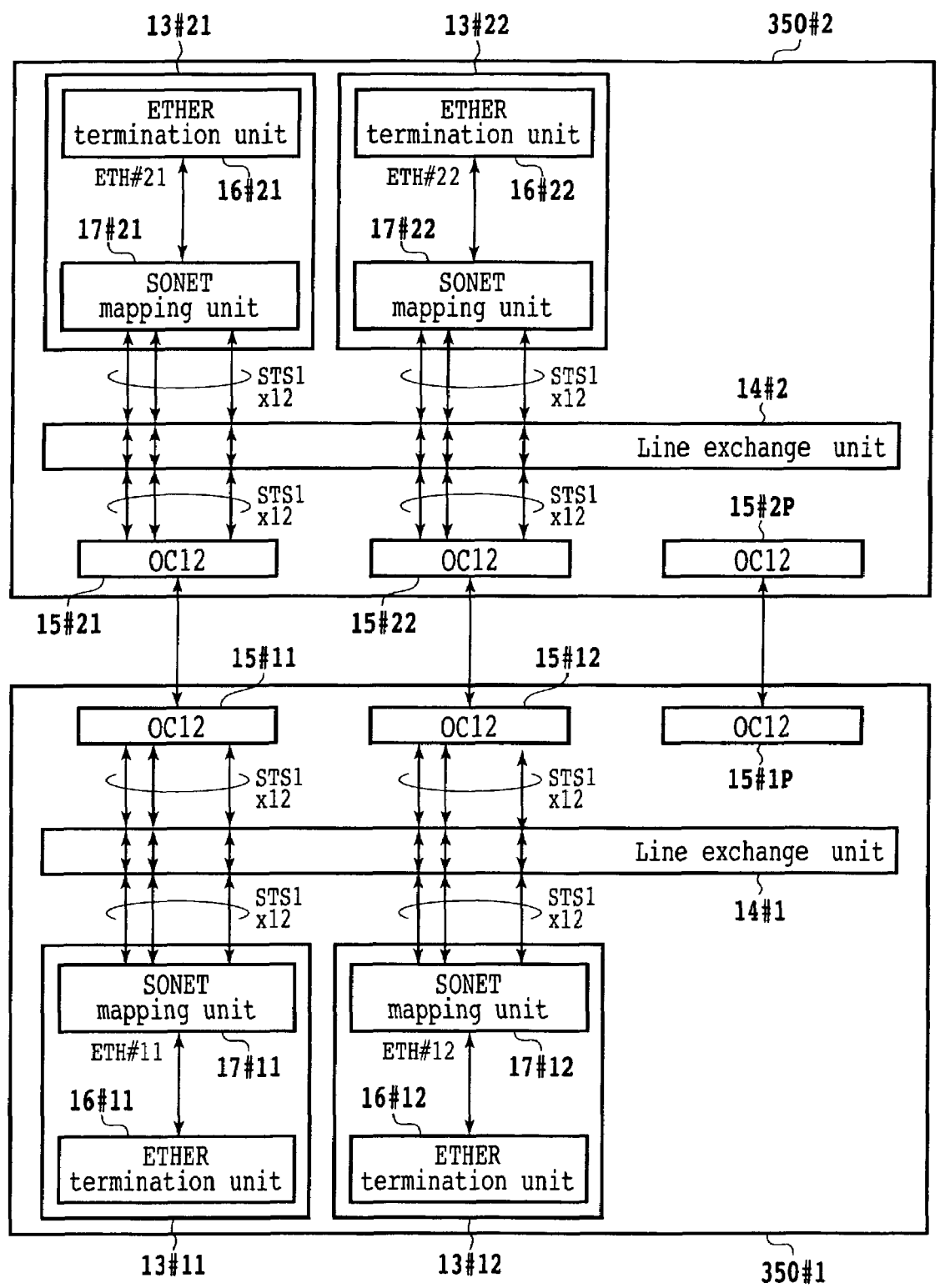
FIG. 28 is an explanatory diagram showing operations carried out in accordance with the conventional APS (1:2) technique in a normal condition.
Figure 29:
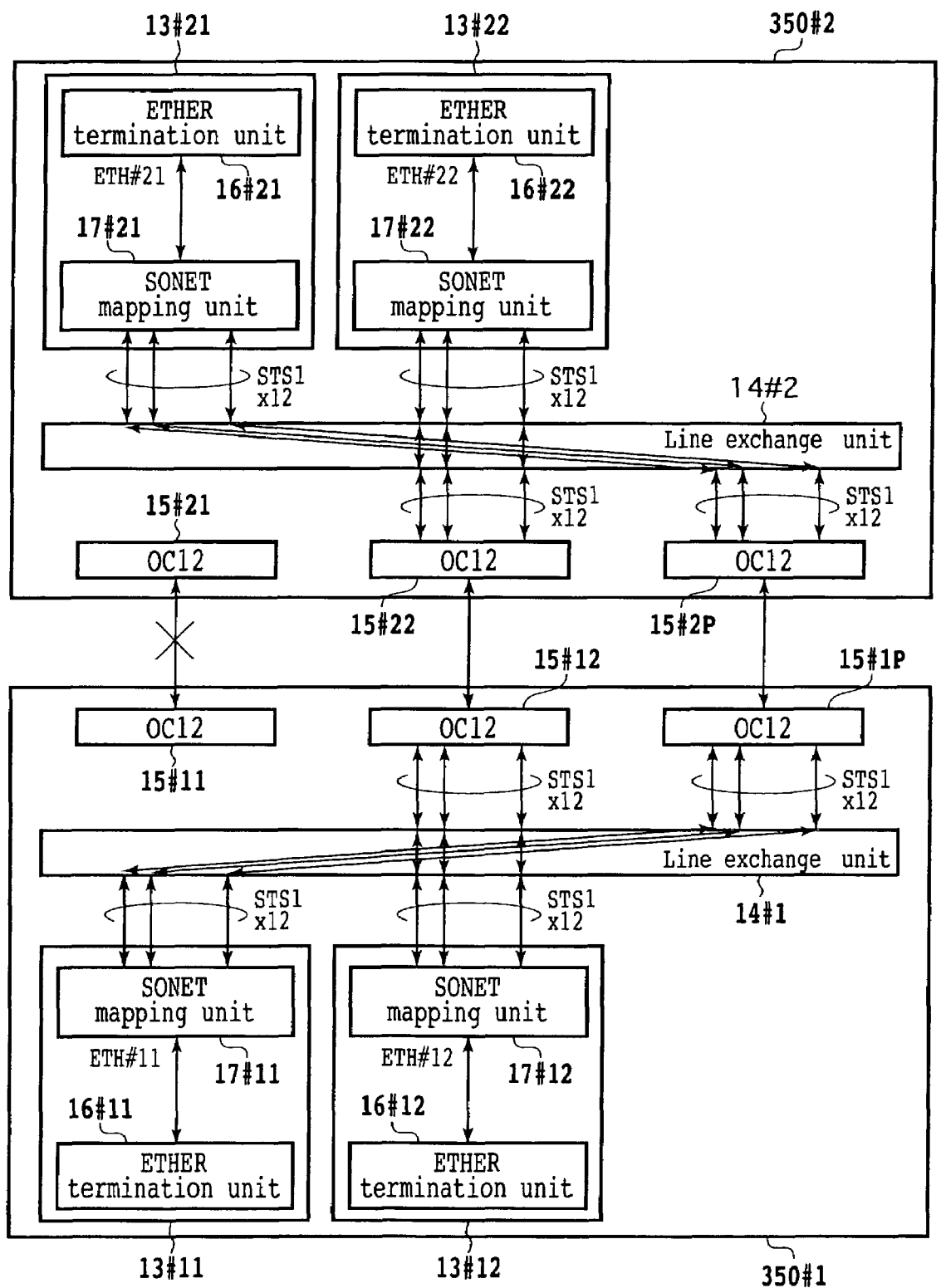
FIG. 29 is an explanatory diagram showing operations carried out in accordance with the conventional APS (1:2) technique in the event of a line failure.
Figure 30:
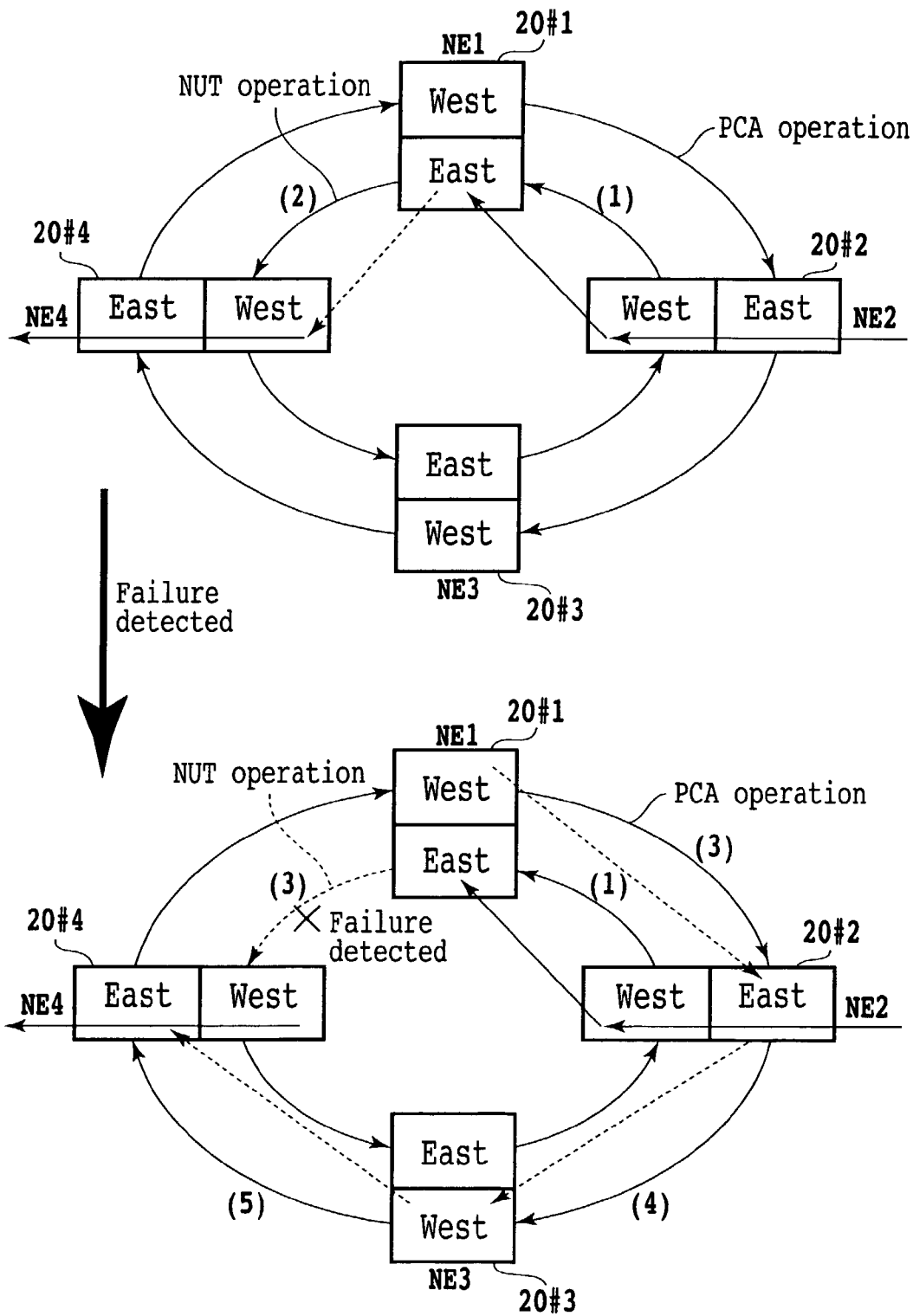
FIG. 30 is a diagram showing a (NUT+PCA) technique of the conventional BLSR method.

FIG. 24 is a block diagram showing the configuration of an NE 500#i used in the network shown in FIG. 23. Configuration elements virtually identical with their counterparts employed in the NE shown in FIG. 19 are denoted by the same reference numerals as the counterparts. A SONET mapping unit 600#i2 of an ETHER interface unit 510#i2 is substantially identical with the SONET mapping unit 380#i1 except that the SONET mapping unit 600#i2 maps a packet onto an STS1X 3 frame instead of an STS1X 12. By the same token, a SONET mapping unit 602#i of an ETHER interface unit 514#i is substantially identical with the SONET mapping unit 392#i except that the SONET mapping unit 602#i maps a packet onto an STS1X 24 frame instead of an STS1X 12. An OC3 interface unit 510#i2 is substantially identical with the OC12 interface unit 362#i2 except that the OC3 interface unit 510#12 multiplexes a frame in an OC3 packet instead of an OC12 packet.

If a line failure is detected on a line between an OC12 interface unit 362#11 and an OC3 interface unit 362#21 and/or a line between an OC3 interface unit 512#12 and an OC3 interface unit 512#22, the spare line between the OC48 interface unit 516#1 and the OC48 interface unit 516#2 is shared by a line between an ETHER interface unit 360#11 and an ETHER interface unit 360#21 and/or a line between an ETHER interface unit 510#12 and an ETHER interface unit 510#22 and the line between the ETHER interface unit 514#1 and the ETHER interface unit 514#2. Since the line capacity of the spare line is big, communications can be carried out without discarding packets.

In the case of this embodiment, a presently used line, on which a line failure has been detected, is replaced by a spare line. However, a presently used line, on which a line failure has been detected, can also be replaced by another presently used line. In addition, a spare line, on which a line failure has been detected, can also be replaced by a presently used line. In this case, the presently used lines and the spare line are each provided with a buffer and a spare SONET mapping unit, which are controlled by the control unit to carry out a switching operation. In accordance with the present invention, in a transmission of connectionless type information called a packet by mapping the packet onto information with a connection type, in the event of a line failure, communications through the failing line are shared by a spare line and a presently used line.

The present invention is not limited to the details of the above described preferred embodiments. The scope of the present invention is defined by the appended claims and all changes and modifications as fall within the equivalence of the scope of the claims are therefore to be embraced by the invention.

What is claimed is:

1. A transmission apparatus for accommodating a plurality of asynchronous networks and a plurality of SONET (Synchronous Optical Network) or SDH (Synchronous Digital Hierarchy) networks, said transmission apparatus comprising:

a plurality of asynchronous network interface units each having an asynchronous network termination unit for inputting and outputting a packet from and to one of said asynchronous networks, and a mapping unit for carrying out a conversion process between said packet and a SONET/SDH frame, each of said plurality of asynchronous network interface units being used as a presently used line or a spare line;

a plurality of SONET/SDH network interface units each used for interfacing with one of said SONET or SDH networks;

a line exchange unit for carrying out line exchange processing between said mapping units and said SONET/SDH network interface units on the basis of line setting;

a buffer provided only on a first asynchronous network interface unit used as the spare line; and a control unit for storing the packet output by a second asynchronous network termination unit used as the presently used line in the event of a line failure occurring in the SONET or SDH network on a route related to the second network interface unit and a packet output by said first asynchronous network termination unit into said buffer by adding identifiers for identifying said first and second asynchronous network termination units, and reading out said packets from said buffer, wherein:

when the line failure does not occur in the SONET or SDH network on the route related to an asynchronous network interface unit used as the presently used line, the packet outputted from the asynchronous network interface unit used as the presently used line is outputted to the mapping unit included in the asynchronous network interface unit used as the presently used line, and when the line failure in the SONET or SDH network on the route related to said second asynchronous network interface unit occurs, the packets outputted from the first and second asynchronous network interface units read out from said buffer are outputted to the mapping unit included in the first asynchronous network interface unit.

2. A transmission apparatus according to claim 1 wherein a packet is output to one of said asynchronous network termination units that is identified by an identifier added to the packet output by said mapping unit of said first asynchronous network interface unit.

3. A transmission apparatus according to claim 1 wherein the bandwidth of one of said SONET or SDH networks, which is used for transmitting a SONET/SDH frame of said first asynchronous network interface unit, is different from those of the other ones of said SONET or SDH networks.

4. A transmission apparatus according to claim 1 wherein one of said SONET or SDH networks, which is used for transmitting a SONET/SDH frame of said first asynchronous network interface unit, is subjected to switching processing based on an APS (Automatic Protection Switch) (1+1) technique, an APS (1:N) technique where N 2, a BLSR (Bidirectional Line Switching Ring) technique or an UPSR (Unidirectional Path Switching Ring) technique.

5. A transmission apparatus for accommodating a plurality of asynchronous networks and a plurality of SONET/(Synchronous Optical Network) or SDH (Synchronous Digital Hierarchy) networks, said transmission apparatus comprising:
- a plurality of asynchronous network interface units each having an asynchronous network termination unit for inputting and outputting a packet from and to one of said asynchronous networks, and a mapping unit for carrying out a conversion process between said packet and a SONET/SDH frame;
- a plurality of SONET/SDH network interface units each used for interfacing with one of said SONET or SDH networks;
- a line exchange unit for carrying out line exchange processing between said mapping units and said SONET/SDH network interface units on the basis of line setting;
- a buffer provided on a first asynchronous network interface unit selected among said asynchronous network interface units to be used as a spare line; and
- a control unit for storing the packet output by said asynchronous network termination unit for accommodating a specific one of said asynchronous networks and the packet output by said asynchronous network termination unit of said first asynchronous network interface unit into said buffer by adding identifiers for identifying said asynchronous network termination units, and reading out said packets from said buffer in the event of a line failure occurring in one of said SONET or SDH networks on a route related to said specific asynchronous network, wherein said control unit:
    - allocates a first line capacity to said specific asynchronous network related to said route, a synchronous network on which has generated the line failure, and a second line capacity to one of said asynchronous networks that is accommodated by said asynchronous network termination unit of said first asynchronous network interface unit; and
    - controls a first packet output by said asynchronous network termination unit accommodating said specific asynchronous network related to said route, said synchronous network on which has generated a line failure, by discarding a second packet output by said asynchronous network termination unit of said first asynchronous network interface unit whose communication traffic exceeds said second line capacity and thus letting said first packet take precedence of said second packet output by said asynchronous network termination unit of said first asynchronous network interface unit.

6. A transmission apparatus for accommodating a plurality of asynchronous networks and a plurality of SONET (Synchronous Optical Network) or SDH (Synchronous Digital Hierarchy) networks, said transmission apparatus comprising:
- a plurality of asynchronous network interface units each having an asynchronous network termination unit for inputting and outputting a packet from and to one of said asynchronous networks, and a mapping unit for carrying out a conversion process between said packet and a SONET/SDH frame;
- a plurality of SONET/SDH network interface units each used for interfacing with one of said SONET or SDH networks;
- a line exchange unit for carrying outline exchange processing between said mapping units and said SONET/SDH network interface units on the basis of line setting;
- a buffer provided on a first asynchronous network interface unit selected among said asynchronous network interface units to be used as a spare line; and
- a control unit for storing the packet output by said asynchronous network termination unit for accommodating a specific one of said asynchronous networks and the packet output by said asynchronous network termination unit of said first asynchronous network interface unit into said buffer by adding identifiers for identifying said asynchronous network termination units, and reading out said packets from said buffer in the event of a line failure occurring in one of said SONET or SDH networks on a route related to said specific asynchronous network, wherein a packet is output to one of said asynchronous network termination units that is identified by an identifier added to a packet output by said mapping unit of said first asynchronous network interface unit;
- said first asynchronous network interface unit further includes a second mapping unit having functions equivalent to those of said mapping unit; and
- said control unit carries out, in the event of a line failure in one of said synchronous networks, switching processing according to a BLSR standard, and forms a judgment as to whether the packet output by said mapping unit of said first asynchronous network interface unit is the packet destined for one of said asynchronous networks that is accommodated by said first asynchronous network interface unit or the packet destined for one of said synchronous networks on the basis of an identifier added to said packet output by said mapping unit of said first asynchronous network interface unit and, if said packet output by said mapping unit of said first asynchronous network interface unit is found to be a packet destined for one of said synchronous networks, said packet output by said mapping unit of said first asynchronous network interface unit is supplied to said second mapping unit.

* * * * *